United States Patent [19]
Sun et al.

[11] Patent Number: 5,914,094
[45] Date of Patent: Jun. 22, 1999

[54] PROCESS FOR PREPARING CATHODE ACTIVE MATERIAL BY A SOL-GEL METHOD

[75] Inventors: Yang Kuk Sun; Seong Ho Jin, both of Daejeon, Rep. of Korea

[73] Assignee: Samsung Display Devices Co., Ltd., Kyungki-do, Rep. of Korea

[21] Appl. No.: 08/768,560

[22] Filed: Dec. 17, 1996

[30] Foreign Application Priority Data

Dec. 19, 1995 [KR] Rep. of Korea ............... 95-52012
Dec. 19, 1995 [KR] Rep. of Korea ............... 95-52013
Apr. 3, 1996 [KR] Rep. of Korea ............... 96-10011

[51] Int. Cl.$^6$ ................................................. C01G 51/04
[52] U.S. Cl. ........................... 423/594; 516/33; 516/98
[58] Field of Search ................. 423/594; 252/315.01

[56] References Cited

U.S. PATENT DOCUMENTS 4,567,031 1/1986 Riley .................................. 423/594
5,211,933 5/1993 Barboux et al. ................... 423/594

*Primary Examiner*—Gary P. Straub
*Assistant Examiner*—Stuart L. Hendrickson
*Attorney, Agent, or Firm*—Christie, Parker & Hale, LLP

[57] ABSTRACT

A process for preparing a $LiCoO_2$ or $LiNiO_2$ powder comprising the steps of dissolving lithium nitrate, lithium acetate or lithium hydroxide and cobalt nitrate, cobalt acetate, cobalt oxide or cobalt hydroxide; or dissolving lithium nitrate, lithium acetate or lithium hydroxide, and nickel nitrate, nickel acetate, nickel oxide or nickel hydroxide to produce a mixed solution, sufficiently mixing the mixed solution with a chelating agent, polyacrylic acid, malic acid or polyvinyl butyral, slowly heating the above to produce a sol, continuously and slowly heating the sol to produce a gel precursor, heating the gel precursor to produce a precursor powder, and calcining the precursor powder to produce a $LiCoO_2$ or $LiNiO_2$ powder is simple and economic. The particles of the powder produced by the process are so microscopic and have a high specific surface area that cathode material of a lithium based secondary cell using the powder shows preferable properties.

27 Claims, 22 Drawing Sheets

(a) 300 °C, (b) 400 °C, (c) 550 °C, (d) 600 °C (a) 0.5, (b) 1.0, (c) 1.5, (d) 2.0

(a) 500 °C, (b) 600 °C, (c) 650 °C, (d) 700 °C (a) 0.75, (b) 1.0, (c) 1.5, (d) 2.0

PROCESS FOR PREPARING CATHODE ACTIVE MATERIAL BY A SOL-GEL METHOD

BACKGROUND OF THE INVENTION (1) Field of the Invention

The present invention relates to a process for preparing $LiCoO_2$ or $LiNiO_2$ used as cathode material in a lithium secondary cell, particularly to a process for preparing $LiCoO_2$ or $LiNiO_2$, which is microscopic and a high specific surface area cathode active material with a chelating agent, polyacrylic acid(PAA), malic acid or polyvinyl butyral (PVB) at low temperature and for a short time.

(2) Description of the Related Art

New portable electronic equipment such as an integrated camera-VTR, audio, lap top type personal computer and cellular phone have been widely used since their introduction into the market. Along with the market expansion, technology has rapidly increased as to make such products smaller and lighter. Therefore, to meet the power needs of the above mentioned products, the demand has been rising for the development of an intelligent battery and power supply with a high density/capacity performance. Generally, a battery is classified as a primary disposable battery such as; Mn battery, Alkaline battery, Hg battery and oxidized Ag battery or a secondary rechargeable lead storage batteries such as; low voltage Ni/MH battery (Metal hydrides used as cathode active material), enclosed Ni-Cd battery, $Ni/H_2$ battery, Li grouped batteries (Li metal battery, LIB: Li ion battery, LPB: Li polymer battery) fuel battery, and solar battery.

Among these two classifications, the primary battery has some problems. Namely, the life span is short, and environment pollution occurs because the primary battery is not reusable. On the other hand, a secondary battery has several advantage over a primary battery; the first advantage is having a longer life span and producing less waste, thereby causing less environmental pollution, since a secondary battery can be recharged and reused, and the second advantage is having better performance and efficiency than a primary battery because the average voltage (3.6 V) of the secondary battery is significantly greater than the average voltage (1.5 V) of the primary battery.

Among the secondary batteries, the Ni/Cd is the most widely used. But, recently, research for Li grouped secondary batteries has been vigorously progressed, because of capacity limitation due to heavy weight and large volume, and because of the decreased memory effect and total capacity due to a non-complete discharge. Compared to the prior Ni/Cd battery, the weight and volume of the Li grouped batteries are less than half the Ni/Cd battery. Thereby allowing very high energy density. In addition, Li grouped batteries have another advantage of being semipermanency.

The Li grouped secondary batteries as mentioned above are composed of a cathode that has 3–4.5 V more than $Li/Li^+$ electrode potential, an anode made of Li metal or material composed of Li metal ($Li_xC_6$, Li-Al, Li-Pb, . . . ), and electrolyte. Among the said cathode materials, the cathode materials of the Li secondary battery that is currently used or has a usable potential include transition metal oxides ($LiCoO_2$, $LiNiO_2$, $LiMn_2O_4$) and oxide solid solutions ($LiM_xCo_{1-x}O_2$, M=Ni, Co, Fe, Mn, Cr, . . . ) and the like. Recently, in fact, a Li ion secondary battery manufactured by Sony Energytec Company and Moli Energy Company is composed of a carbon material as an anode active component, $LiCoO_2$ and $LiNiO_2$, as an cathode active component for Sony Energytec Company and Moli Energy Company respectively, and $PC/DEC/LiPF_5$ (PC: Propylene Carbonate, DEC: Diethylene Carbonate) as an electrolyte. The $LiCoO_2$ amongst the said cathode material is widely used now. And, recently, it showed good performance when used as an alternative cathode for melting carbonate salt. Furthermore, another advantage, is that the cost of production of $LiNiO_2$ is lower that any other cathode material.

However, because the capacity of the currently used cathode material of 140–270 mAh/g is relatively low compared to the theoretical total capacity value of 372 mAh/g for the $Li_1C_6$ Standard, and only 20–30% of the theoretical total capacity is available with the current technology level. Therefore, efforts to improve the prior cathode material is attempting to avail further theoretical capacity in parallel to developments of new cathode material that has a higher capacity. In general, the quality powder of cathode material is determined by a good crystal property, a homogeneity, a homogeneous powder morphology having narrow particle distribution, and specific surface area. The reason is based on the fact that while charge-discharge occurs, the charge of microstructure is inhibited, and also, the more the cathode material has a specific surface area, the more it has reactive area.

The most general method for the preparation of $LiCoO_2$ or $LiNiO_2$ widely used as a cathode active material in a Li secondary battery like the said material is solid phase reaction method. This method performs several cycles in the process of mixing and calcining of the raw materials, namely carbonate salt and hydroxide of each component. But this method, in the case of preparing $LiCoO_2$ or $LiNiO_2$, allows a large quantity of contaminants in the mixing stage of the raw materials thereby making it difficult to obtain a homogeneous phase, since non homogeneous reactions occur more easily, and uniform control of the size of the powder. As a result, the sintering property is dropped, and the specific surface area of the powder is lowered due to a high temperature and a long process time is needed and the use of the resultant prepared $LiCoO_2$ or $LiNiO_2$ in this way as a cathode material causes the problems that the electrode performance is lowered.

SUMMARY OF THE INVENTION

It is an object of the present invention to provide a process for preparing $LiCoO_2$ or $LiNiO_2$ by a sol-gel method. If $LiCoO_2$ or $LiNiO_2$ is prepared by the sol-gel method, impurities are not mixed during the process, homogeneous $LiCoO_2$ or $LiNiO_2$ can be obtained, preferable sintering property is achieved by controlling the size of the powder particles and a high specific surface area can be obtained by performing the method at a low temperature and for a short time.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE INVENTION

Figure 1:
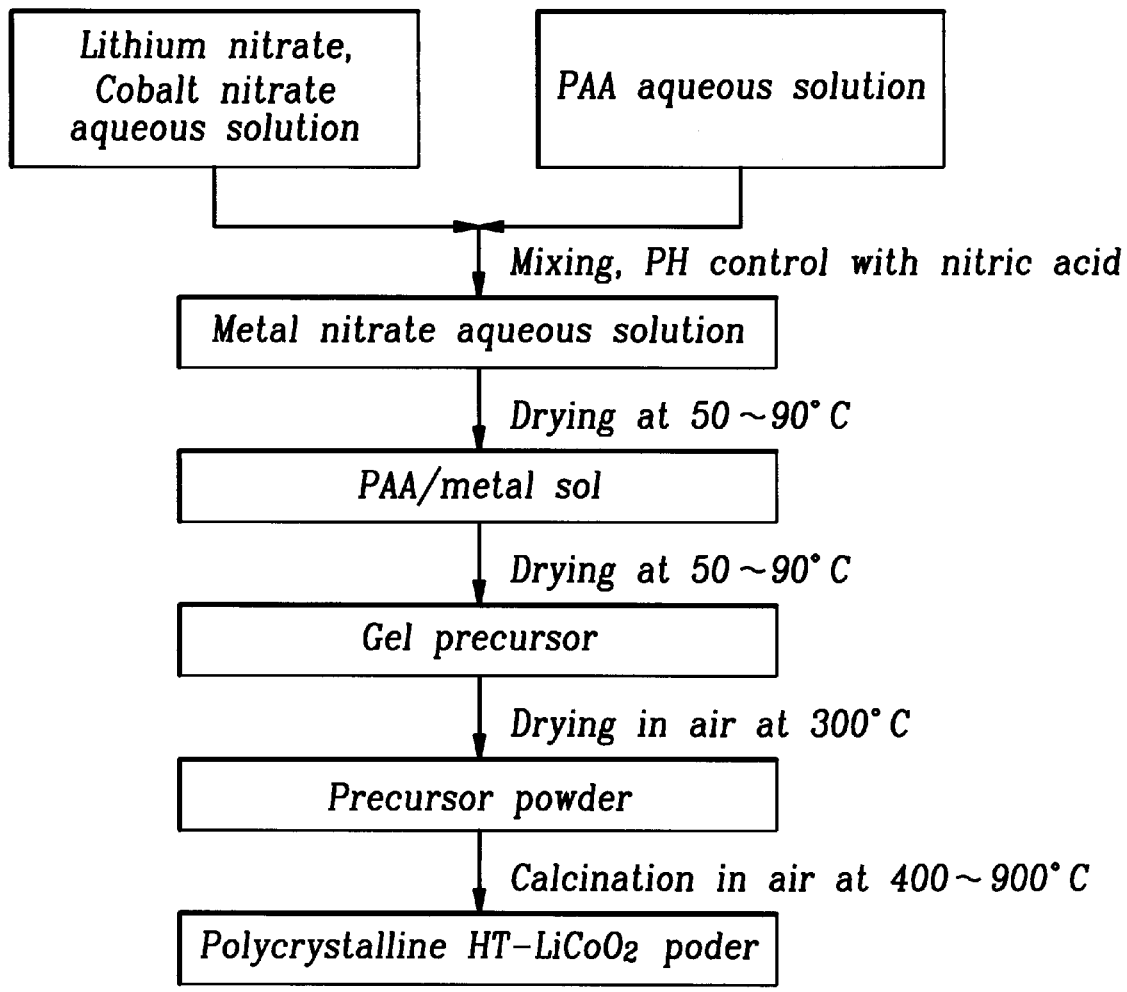
FIGS. 1, 13 and 19 are flow sheets for the preparation procedure of $LiCoO_2$ or $LiNiO_2$ by a sol-gel method according to working examples of the present invention.

To achieve the above object, the present invention provides a process for preparing $LiCoO_2$ comprising the steps of mixing aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of polyacrylic acid (PAA) to produce a mixed aqueous solution, controlling the pH of the mixed aqueous solution between 1 to 4, heating the mixed aqueous solution at 50 to 90° C. to produce a sol, heating the sol from 50 to 90° C. to produce a gel precursor, heating the gel precursor above 300° C. to produce a precursor powder and calcining the precursor powder from 400 to 900° C. Wherein it is preferable that the precursor powder is calcined from 400 to 600° C., the molar ratio of total metal ions to polyacrylic acid is above 0.25 and the step of controlling the pH of the mixed aqueous solution is performed by adding nitric acid in a dropwise manner.

The present invention also provides a process for preparing $LiCoO_2$ comprising the steps of mixing an aqueous solution of metal salt prepared by dissolving the above first compound, and above second compound in water with an aqueous solution of malic acid to produce a mixed aqueous solution, controlling the pH of the mixed aqueous solution between 4.5 to 5.5, heating the aqueous solution from 50 to 90° C. to produce a sol, heating the sol from 50 to 90° C. to produce a gel precursor, heating the gel precursor above 400° C. to produce a precursor powder and calcining the precursor powder from 500 to 900° C. Wherein it is preferable that the precursor powder is calcined from 600 to 900° C. and the molar ratio of the total metal ions to malic acid is above 0.5.

In the above process for preparing $LiCoO_2$, it is preferable that the metal salt aqueous solution is prepared by dissolving $CH_3COOLi.2H_2O$; and $Co(NO_3)_2.6H_2O$ into water, mixing the above first compound to the above second compound to a molar ratio of 1 to 1.2:1 and performing the calcination is performed under oxidative atmosphere.

The present invention also provides (1) a process for preparing $LiCoO_2$ sol comprising the steps of mixing aqueous solution of metal salt prepared by dissolving the above first compound, and the above second compound in water with an aqueous solution of polyacrylic acid to produce a mixed aqueous solution, controlling the pH of the mixed aqueous solution between 1 to 4 and heating the mixed aqueous solution from 50 to 90° C. to produce a sol, (2) a process for preparing $LiCoO_2$ gel precursor further comprising a step of heating the $LiCoO_2$ sol from 50 to 90° C. and (3) a process for preparing $LiCoO_2$ precursor powder further comprising a step of heating the $LiCoO_2$ gel precursor above 300° C.

The present invention also provides (1) a process for preparing $LiCoO_2$ sol comprising the steps of mixing an aqueous solution of metal salt prepared by dissolving the above first compound, and the above second compound in water with an aqueous solution of malic acid to produce a mixed aqueous solution, controlling the pH of the mixed aqueous solution between 4.5 to 5.5 and heating the mixed aqueous solution from 50 to 90° C. to produce a sol, (2) a process for preparing $LiCoO_2$ gel precursor further comprising a step of heating the $LiCoO_2$ sol from 50 to 90° C. and (3) a process for preparing $LiCoO_2$ precursor powder further comprising a step of heating the $LiCoO_2$ gel precursor above 400° C.

And the present invention provides $LiCoO_2$, $LiCoO_2$ sol, $LiCoO_2$ gel precursor and $LiCoO_2$ precursor powder prepared by the above sol-gel methods.

The present invention also provides a process for preparing $LiNiO_2$ comprising the steps of mixing ethanol solution of metal salt prepared by dissolving the above first compound, and a third compound selected from the group consisting of nickel nitrate, nickel acetate, nickel oxide and nickel hydroxide in an ethanol solution with an ethanol solution of polyvinyl butyral to produce a mixed solution, heating the mixed solution from 70 to 80° C. to produce a sol, heating the sol from 70 to 80° C. to produce a gel precursor, heating the gel precursor above 500° C. to produce a precursor powder and calcining the precursor powder from 600 to 900° C. Wherein it is preferable that the mixing molar ratio of lithium nitrate or lithium acetate to nickel nitrate or nickel acetate is 1 to 1.2:1, the molar ratio of total metal ion over polyvinyl butyral is above 0.1 to 4, the calcination is performed under oxidative atmosphere, which is a flow of oxygen for 5 hours or more.

The present invention also provides (1) a process for preparing $LiNiO_2$ sol comprising the steps of mixing an ethanol solution of metal salt prepared by dissolving the above first compound, and the above third compound in an ethanol solution with an ethanol solution of polyvinyl butyral to produce a mixed solution and heating said mixed solution from 70 to 80° C. to produce a sol, (2) a process for preparing $LiNiO_2$ gel precursor further comprising a step of heating the $LiNiO_2$ sol from 70 to 80° C. and (3) a process for preparing $LiNiO_2$ precursor powder further comprising a step of heating the $LiNiO_2$ gel precursor above 500° C.

And the present invention provides $LiNiO_2$, $LiNiO_2$ sol, $LiNiO_2$ gel precursor and $LiNiO_2$ precursor powder prepared by the above sol-gel methods.

Sol-gel methods are widely studied in the ceramic production industry. In the general process of sol-gel method, metal alkoxide is dissolved in a non-aqueous solvent, and then the mixed solution is prepared to a sol-state material through hydrolysis and polymerization reaction. Subsequently, the sol-state material is prepared to a gel-state material by varying the temperature, concentration and other conditions. And ceramic powders are obtained by drying the gel-state material through heat treatment. The above sol-gel method for preparing ceramics has favorable aspects listed below:

(1) A composition ratio can be easily controlled.
(2) Homogeneous production is produced through sol and gel modification.
(3) Impurities are not mixed in the process.
(4) Sintered materials can be obtained at a low temperature and for a short time.
(5) The material can be transformed to sphere, membrane or fiber.

The present invention is further explained in more detail with reference to the following example which is limited to this invention.

EXAMPLE

In the case of using PAA as a chelating agent

As shown in FIG. 1, $CH_3COOLi.2H_2O$; and $Co(NO_3)_2.6H_2O$ are accurately weighed to the molar ratio of 1 to 1.2:1, and dissolved in distilled water to prepare a metal aqueous solution. Thereafter, PAA aqueous solution is prepared in order to achieve total metal ion over polyacrylic acid molar ratio of at least 0.25. The metal aqueous solution and PAA aqueous solution are mixed well. While shaking with a magnetic stirrer, nitric acid is added slowly to the mixed aqueous solution until the pH is 1 to 4.

The mixed aqueous solution is heated from 50 to 90° C. to prepare a sol and the sol is gently heated to prepare a gel precursor. The gel precursor is heat-treated above 300° C. for 1 hour or more under air to prepare a precursor powder and the precursor powder is calcined from 400 to 900° C. for 1 hour or more under air to obtain LiCoO2 powder prepared at a low temperature and a high temperature, respectively.

In the case of using malic acid as chelating agent

Figure 13:
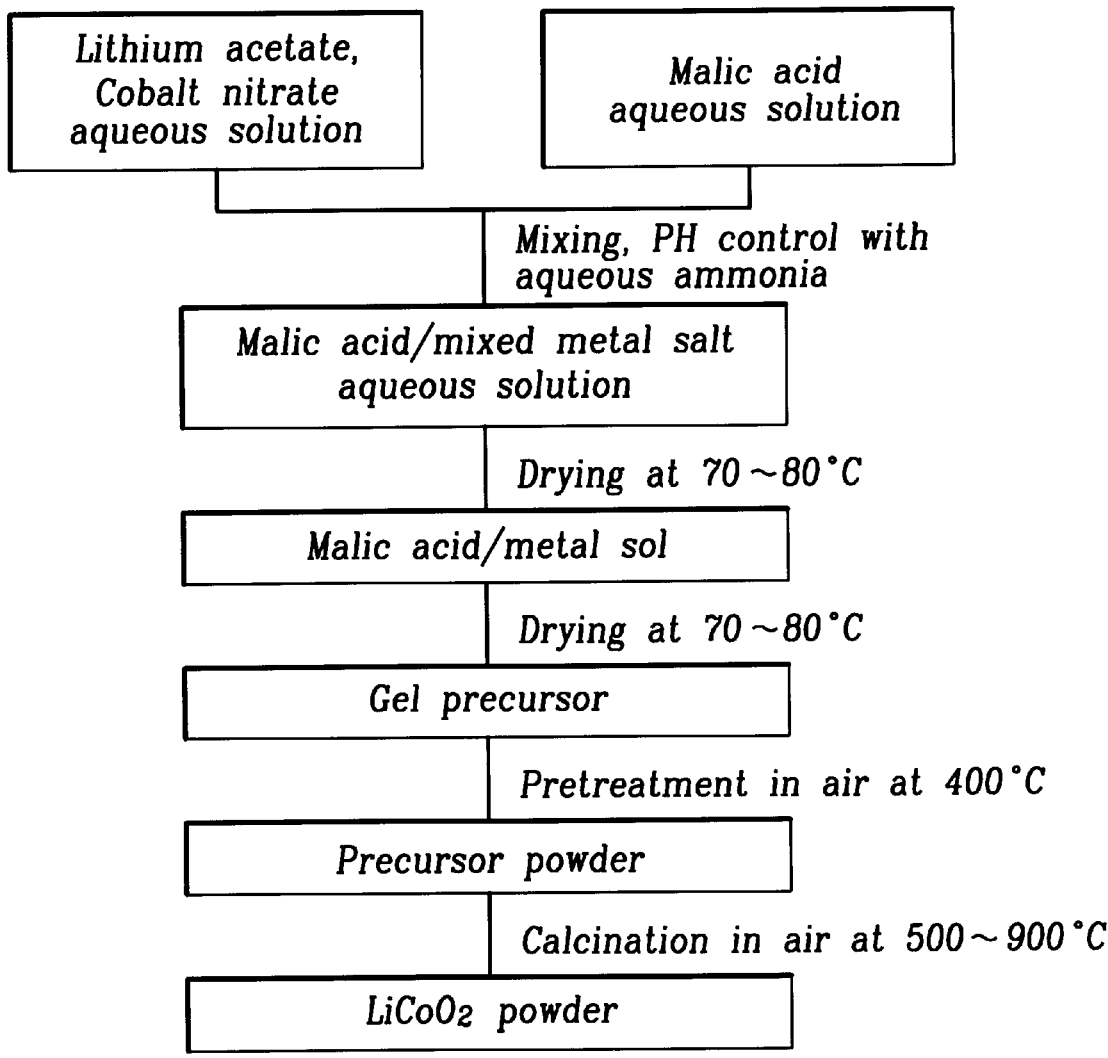

As shown in FIG. 13, $CH_3COOLi.2H_2O$; and $Co(NO_3)_2.6H_2O$ are accurately weighed to the molar ratio of 1 to 1.2:1, and dissolved in distilled water to prepare a metal aqueous solution. Thereafter, malic acid aqueous solution is prepared in order to achieve a molar ratio of total metal ions to malic acid of at least 0.75. The metal aqueous solution and malic acid aqueous solution are mixed well. Ammonia water is added to the mixed aqueous solution at a rate of 2 cc/min until the pH is 4.5 to 5.5.

The mixed aqueous solution is heated from 50 to 90° C., preferably from 70 to 80° C., to prepare a sol and the sol is gently heated to prepare a gel precursor. The gel precursor is heat-treated above 400° C. for 1 hour or more under air to prepare a precursor powder and the precursor powder is calcined from 500 to 900° C. for 1 hour or more under air to obtain $LiCoO_2$ powder prepared at a low temperature and a high temperature, respectively.

In the case of using polyvinyl butyral as a chelating agent

Figure 19:
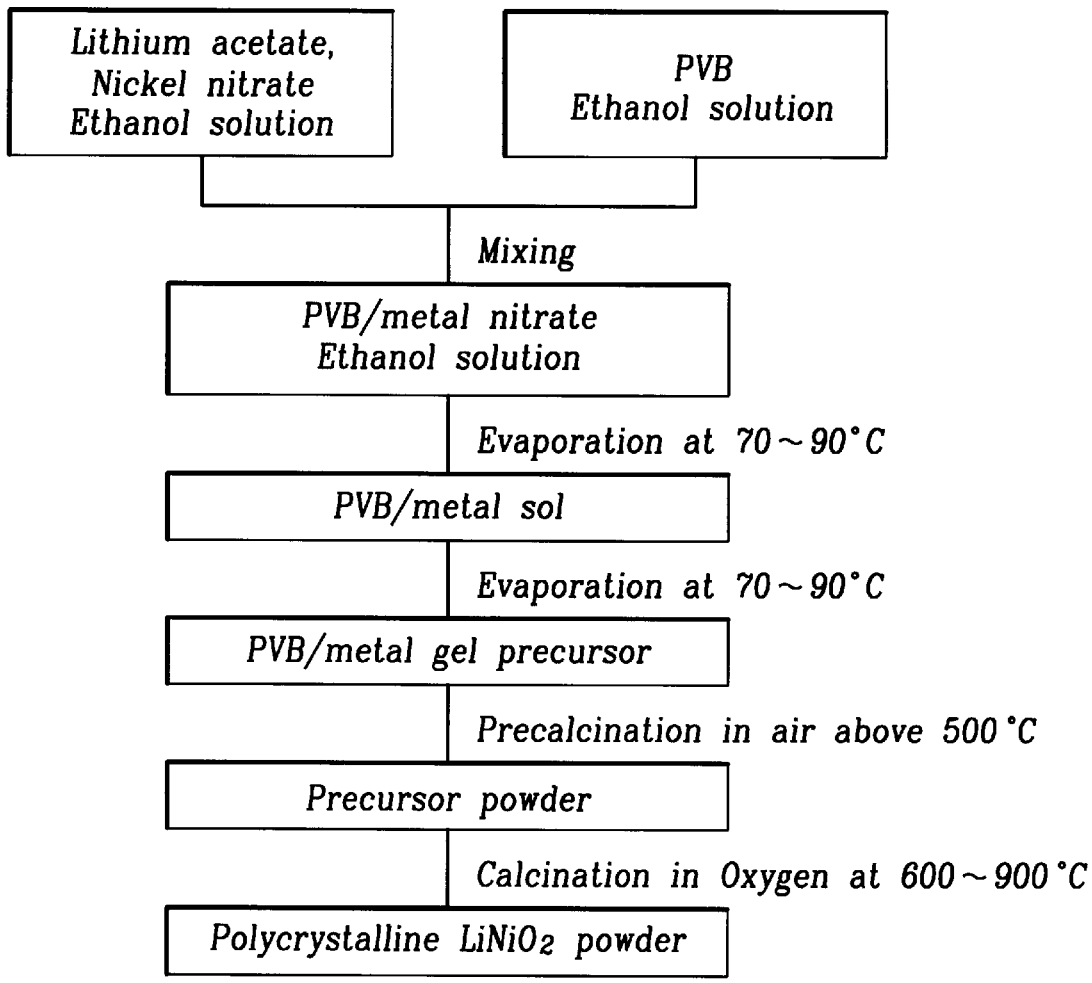

As shown in FIG. 19, $CH_3COOLi.2H_2O$; and $Ni(NO_3)_2.6H_2O$ are exactly weighed to the molar ratio of 1 to 1.2:1, and dissolved in ethanol to prepare a metal ethanol solution. Thereafter, polyvinyl butyral (PVB) ethanol solution is prepared in order to achieve a PVB to total metal ions molar ratio of 1 to 4. The metal ethanol solution and PVB aqueous solution are mixed well.

The mixed ethanol solution is heated at a constant temperature in a magnetic stirrer or drier to prepare a sol and the sol is gently heated to prepare a gel precursor. The color of the gel precursor is very transparent, and this transparent color is an indication that homogeneous gel precursor is prepared by the method of the present invention. In the present invention, the gel is prepared by a mechanism for preparing PVB-metal cation complex by interacting aldehyde functional group and alcohol functional in polyvinyl butyral, and metal cation.

The gel precursor is heat-treated above 500° C. for 1 hour or more under air to prepare a precursor powder and the precursor powder is calcined from 600 to 900° C. for 5 hours or more under oxidative atmosphere to obtain $LiNiO_2$ powder.

EXAMPLE 1

A metal salt aqueous solution with a $CH_3COOLi.2H_2O$; to $Co(NO_3)_2.6H_2O$; molar ratio of 1:1 was prepared by dissolving 102.02 g of $CH_3COOLi.2H_2O$ and 291.03 g of $Co(NO_3)_2.6H_2O$; in 350 g of distilled water and a PAA aqueous solution with a total metal ions to PAA molar ratio of 0.5 was prepared by dissolving 72 g of PAA in 100 g of distilled water. The metal salt aqueous solution and PAA aqueous solution were mixed, heated from 70 to 80° C. for 6 hours to prepare a sol, and then the sol was gently heated from 70 to 80° C. for 2 hours to prepare a gel precursor. The gel precursor was heat-treated at 300° C. for 1 hour under air, and then calcined at 400, 550 and 600° C. for 1 hour under air to obtain $LiCoO_2$ powder prepared at a low temperature and a high temperature, respectively.

EXAMPLE 2

$LiCoO_2$ powder was prepared by the same procedure as in Example 1 except that the molar ratio of total metal ions to PAA was 1.0.

EXAMPLE 3

$LiCoO_2$ powder was prepared by the same procedure as in Example 1 except that the molar ratio of total metal ions to PAA was 1.5, and the heat-treated gel precursor was calcined at 750 and 800° C. for 10 hours.

EXAMPLE 4

$LiCoO_2$ powder was prepared by the same procedure as in Example 1 except that the molar ratio of total metal ions to PAA was 1.5, and the heat-treated gel precursor was calcined at 300, 400, 500, 550, 600 and 650° C.

EXAMPLE 5

$LiCoO_2$ powder was prepared by the same procedure as in Example 1 except that the molar ratio of total metal ions to PAA was 2.0.

EXAMPLE 6

A metal salt aqueous solution with a $CH_3COOLi.2H_2O$; to $Co(NO_3)_2.6H_2O$; molar ratio of 1:1 was prepared by dissolving 109.02 g of $CH_3COOLi.2H_2O$ and 291.03 g of $Co(NO_3)_2.6H_2O$; in 350 g of distilled water and a malic acid aqueous solution with a total metal ions to malic acid molar ratio of 0.75 was prepared by dissolving 116 g of malic acid in 100 g of distilled water. The metal salt aqueous solution and malic acid aqueous solution were mixed, ammonia water was added to the mixture at a rate of 2 cc/min until the pH is 4.5 to 5.5. The pH controlled mixture was heated from 70 to 80° C. for 1 hour to prepare a gel precursor. The to gel precursor was heat-treated at 400° C. for 1 hour under air and was calcined at 500, 600, 650 and 700° C., respectively for 1 hour under air to prepare $LiCoO_2$ powder, respectively.

EXAMPLE 7

$LiCoO_2$ powder was prepared by the same procedure as Example 6 except that the molar ratio of total metal ions to malic acid was 1.0.

EXAMPLE 8

$LiCoO_2$ powder was prepared by the same procedure as in Example 6 except that the molar ratio of total metal ions to malic acid was 1.5 and the heat-treated gel precursor was calcined at 400, 500, 600, 650 and 700° C.

EXAMPLE 9

$LiCoO_2$ powder was prepared by the same procedure as Example 6 except that the molar ratio of total metal ions to malic acid was 2.0.

EXAMPLE 10

A metal salt ethanol solution with a $CH_3COOLi.2H_2O$; to $Ni(NO_3)_2.6H_2O$ molar ratio of 1:1 was prepared by dissolving 25.505 g of $CH_3COOLi.2H_2O$ and 72.577 g of $Ni(NO_3)_2.6H_2O$; in 100 g of ethanol and a PVB ethanol solution with a total metal ions to PVB molar ratio of 1 was prepared by dissolving 71 g of PVB 100 g of ethanol. The metal salt solution and PVB ethanol solution were mixed, heated from 70 to 90° C. for 8 hours to prepare a sol. The sol was heated from 70 to 90° C. for 2 hours to prepare a gel precursor. The gel precursor was heat-treated at 500° C. for 1 hour under air and was calcined at 750° C. for 5 hours under oxidative atmosphere to prepare $LiNiO_2$ powder.

EXAMPLE 11

$LiNiO_2$ powder was prepared by the same procedure as Example 10 except that 142 g of PVB was dissolved in 150 g of ethanol so that the molar ratio of total metal ions to PVB was 2.

EXAMPLE 12

$LiNiO_2$ powder was prepared by the same procedure as Example 10 except that 213 g of PVB was dissolved in 200 g of ethanol so that the molar ratio of total metal ions to PVB was 3.

EXAMPLE 13

$LiNiO_2$ was prepared by the same procedure as Example 10 except that 284 g of PVB was dissolved in 250 g of ethanol so that the molar ratio of total metal ions to PVB was 4.

COMPARATIVE EXAMPLE 1

A mixture of $CH_3COOLi.2H_2O$ and $Co(NO_3)_2.6H_2O$; with molar ratio of 1:1 was pulverized with a ball mill. Thereafter, $LiCoO_2$ was prepared at a low temperature and calcined at 400° C. for 1 week and $LiCoO_2$ was prepared at a high temperature and calcined at 900° C. for more than 24 hours. The calcined $LiCoO_2$ was cooled to prepare a polycrystalline $LiCoO_2$.

COMPARATIVE EXAMPLE 2

Preparation of $LiNiO_2$ powder by a nitrate method $LiNO_3$ and $NiCo_3$ were accurately weighed to the molar ratio of 1:1, pretreated at 150° C. for 12 hours under air, and heat-treated at 600° C. for 16 hours under oxidative atmosphere and air. The heat-treated sample was thoroughly pulverized using a ball mill and formed pellet. Thereafter, The pellet was calcined at 750° C. for 24 hours under air to prepare $LiNiO_2$ powder.

COMPARATIVE EXAMPLE 3

Preparation of $LiNiO_2$ powder by spray pyrolysis $LiNO_3$ and $Ni(NO_3)_2.6H_2O$ were weighed to the molar ratio of 1:1 and diluted to 0.5 $mol/dm^3$ with distilled water. 3 μm of mist in the solution was prepared using 1.6 MHz of vibration frequency. The mist was passed through a quartz tube using air as a carrier gas and collected using cyclone of outlet of the quarts tube. The collected mist was heat-treated at 700° C. under oxidative atmosphere to prepare $LiNiO_2$ powder.

COMPARATIVE EXAMPLE 4

Preparation of $LiNiO_2$ powder by a solid state method $LiNO_3$ and $Ni(OH)_2$ were weighed to the molar ratio of 1:1 and mixed well to prepare a pellet having 23 mm of radius and 5 mm of thickness. The pellet was dried at 150° C. for 12 hours under air. The dried pellet was calcined at 600° C. for 16 hours under oxidative atmosphere, pulverized and calcined at 750° C. for 24 hours under oxidative atmosphere to prepare $LiNiO_2$ powder.

Determination of Changing Gel Precursor into Ceramics

Figure 2:
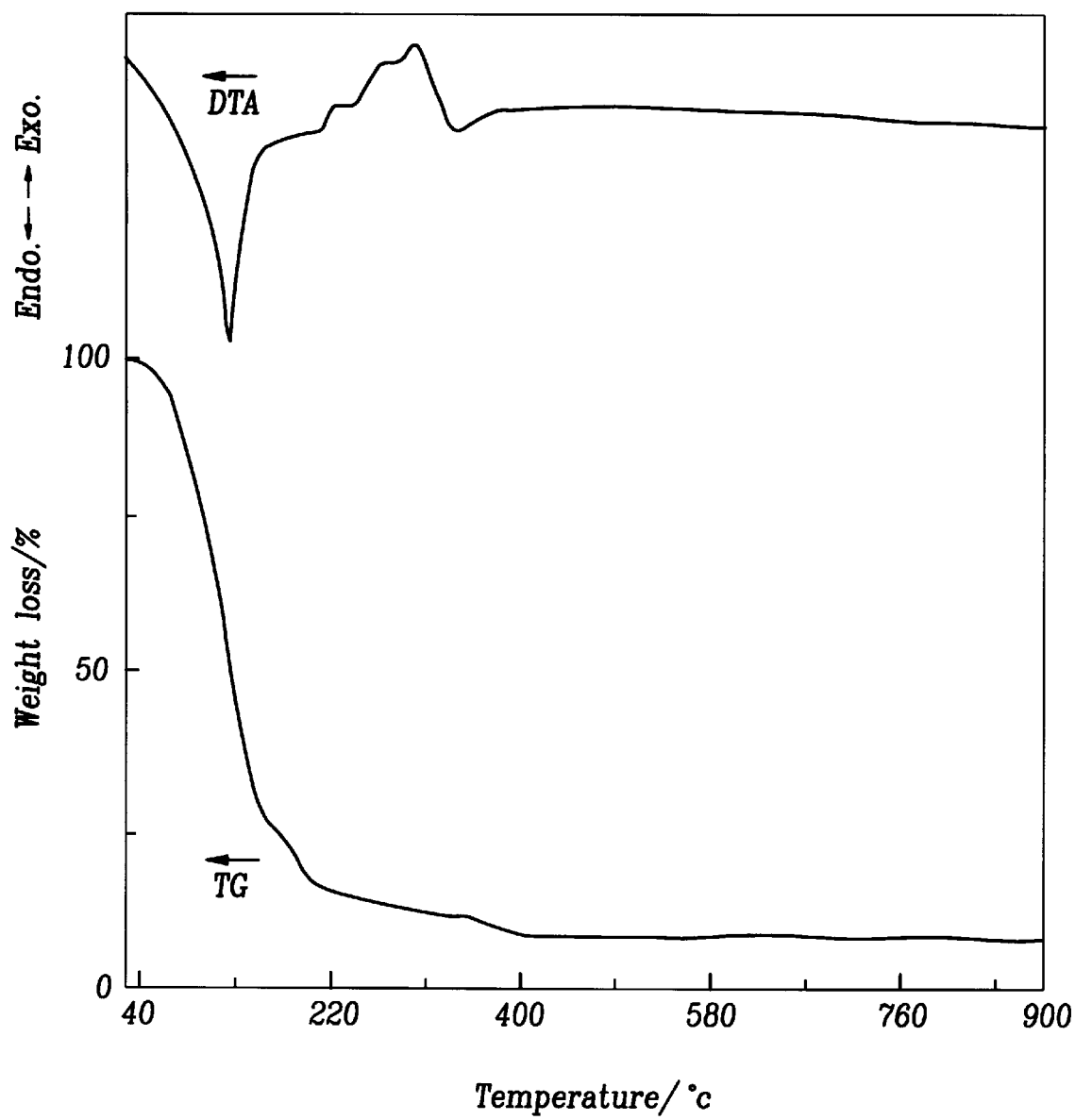
FIGS. 2, 14 and 20 are Thermogravimetric and Differential thermal analysis graphs showing the transition procedure from gel precursors to ceramics when $LiCoO_2$ or $LiNiO_2$ is prepared by a sol-gel method.

In preparing $LiCoO_2$ by procedure in Example 2 in which the molar ratio of total metal to PAA was 1, thermal behavior was examined by TG-DTA to examine the change of gel precursor into ceramic and the result is shown in FIG. 2. As shown in FIG. 2, the weight loss of the gel precursor occurred from 40 to 180° C. and 180 to 380° C. and terminated at 380° C. The weight loss from 40 to 180° C. was caused by evaporating water in the gel precursor and the results corresponds to the endothermic peak shown at 135° C. in the DTA curve. The weight loss of the gel precursor from 180to 380° C. was due to inorganic material such as nitric acid and organic material such as PAA and the results thereof corresponds to the exothermic peak at 229, 251, 277° C. in the DTA curve. Exothermic peak at 229° C. was caused by decomposition of nitric acid, and the results confirms that decomposition of nitric acid in citric acid-nitric acid gel occurred at about 200° C. It was considered that the exothermic peak at 251 and 277° C. was due to pyrolysis of PAA, and powder calcined at 300° C. changed into a swelling dark blue powder. Exothermic peaked at 340° C. in the DTA curve was caused by crystallization of $LiCoO_2$.

Figure 14:
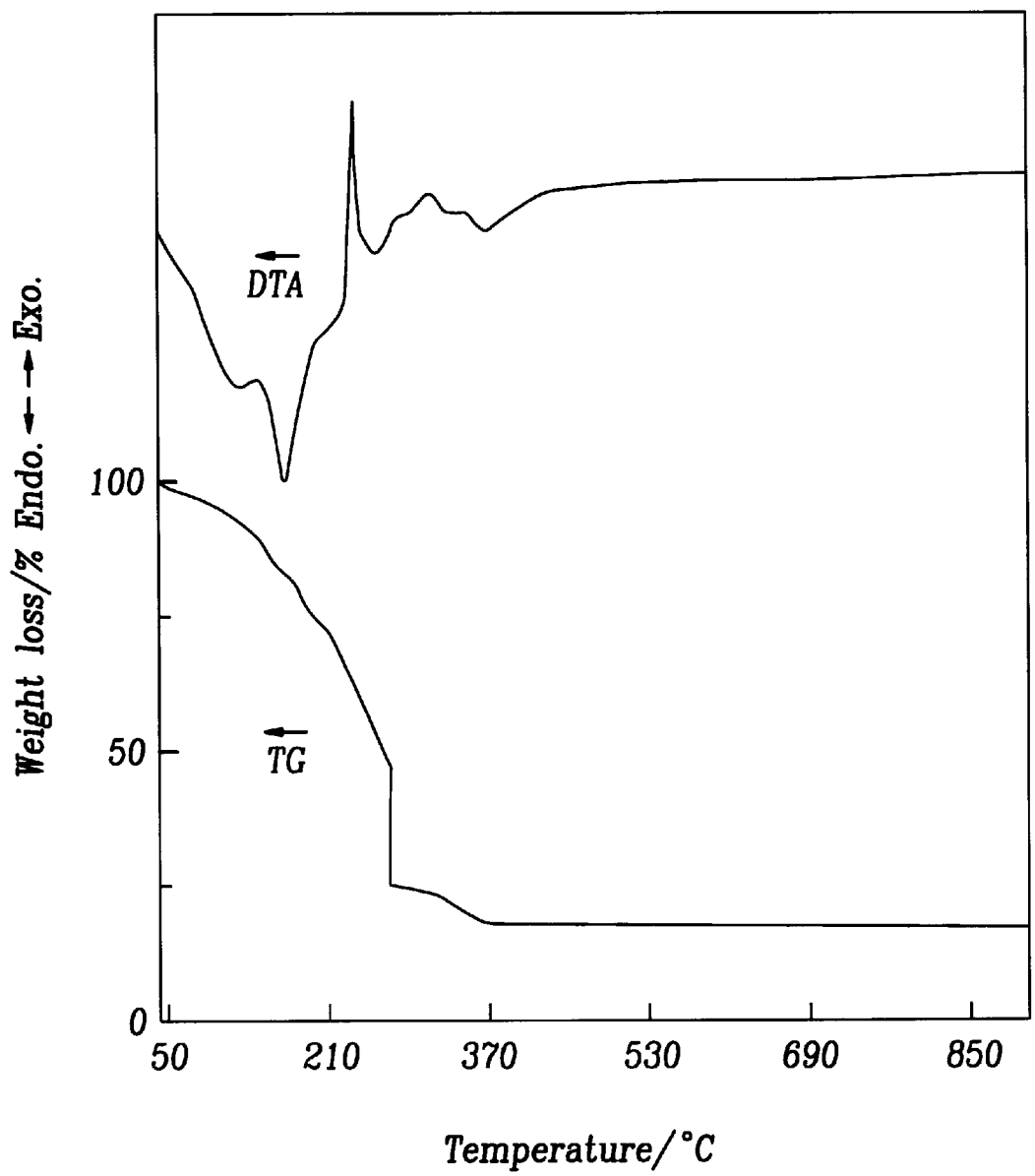

Furthermore, in preparing $LiCoO_2$ by the procedure in Example 8 in which the molar ratio of total metal ions to malic acid was 1.5, thermal behavior of the gel precursor was examined by TG-DTA to examine the change of the gel precursor into ceramic, and the result thereof is shown in FIG. 14. As shown in FIG. 14, the weight loss of the gel precursor occurred from 40 to 215° C., 215 to 276° C. and 276 to 454° C., and terminated at 453° C. The weight loss from 40 to 215° C. was caused by evaporating water in the gel precursor and the results corresponds to the endothermic peak shown at 90 and 140° C. in the DTA curve. The weight loss of the gel precursor from 215 to 276° C. was due to nitric acid and malic acid in the gel precursor and the results corresponds to the exothermic peak at 235° C. in the DTA curve. The amount of weight loss of the gel precursor was half of the initial amount of the gel precursor and the results were due to severe oxidation and decomposition reaction caused by accelerating decomposition of nitric acid ion according to the action of malic acid as a fuel. The results confirmed that occurrence of decomposition of nitric acid at 200° C. in citric-nitric acid gel. The weight loss from 276 to 454° C. correspondes to the decomposition of the remaining organic material, the exothermic peak at 290, 313 and 345° C. and the endothermic peak at 370° C. are shown in the DTA curve. The endothermic peak at 370° C. shown in the DTA curve corresponds to the peak according to the crystallization of $LiCoO_2$.

Figure 20:
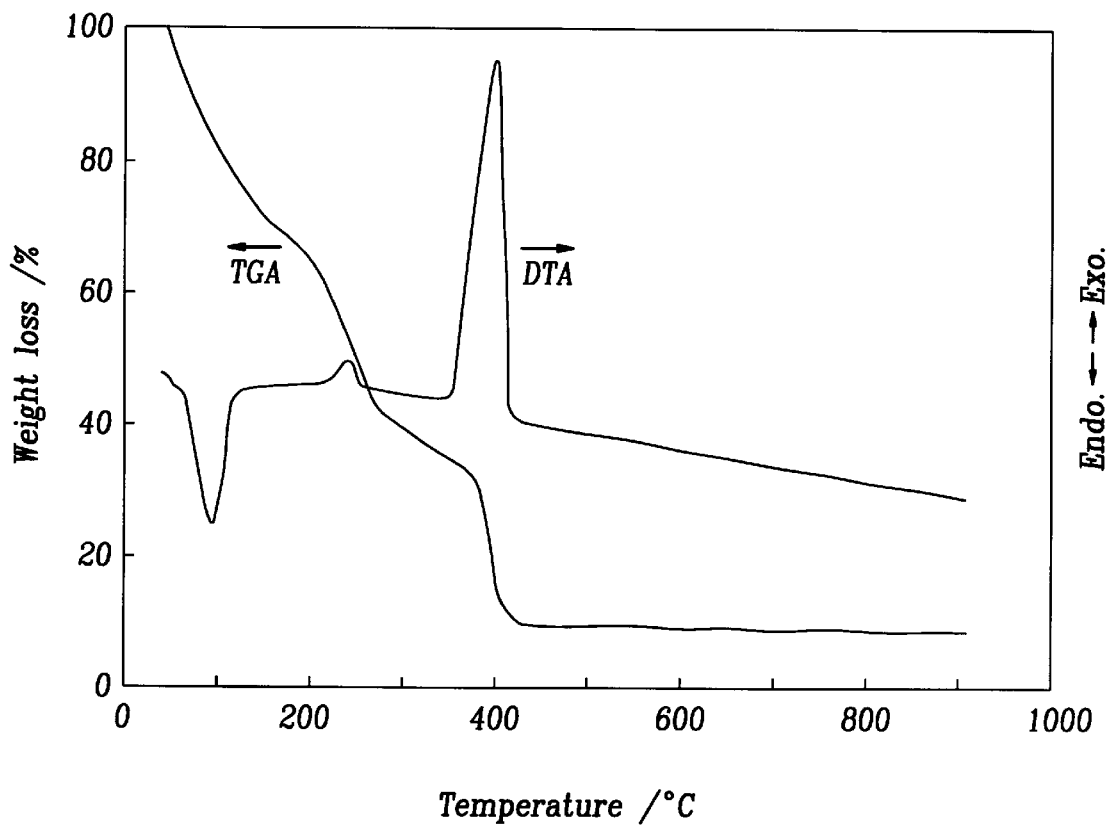

In preparing $LiNiO_2$ by the procedure in Example 11 in which the molar ratio of total metal ions to PVB was 2, thermal behavior of the gel precursor was examined by TG-DTA to examine the change of the gel precursor into ceramic and the results thereof is shown in FIG. 20. As shown in FIG. 20, the weight loss of the gel precursor occurred from 40 to 180° C., 180 to 260° C. and 260 to 425° C., and terminated at 425° C. The weight loss of the gel precursor from 40 to 180° C. was caused by evaporating ethanol in the gel precursor, the weight loss corresponds to the endothermic peak shown at 95° C. in the DTA curve. The weight loss of the gel precursor was due to water produced by decomposition of nitric acid in the gel precursor and dehydrogenation which was converted to a vinyl alcohol unit in PVB into —CH=CH—, and corresponds to the exothermic peak at 235° C. The results confirmed that decomposition of nitric acid in citric-nitric acid gel occurred at 200° C. The weight loss of the gel precursor from 260 to 425° C. was caused by decomposing the remaining organic material such as butyral and crotonaldehyde, and the exothermic peak is shown at 400° C. in the DTA curve. The amount of weight loss of gel precursor was 35% by weight of initial amount of the gel precursor. It is considered that the results were due to severe oxidation and decomposition reaction caused by accelerating the decomposition of the remaining organic material according to an action of nitric acid ion as a fuel in the presence of metal ion in the decomposition of the gel precursor.

Change of Chemical Composition of $LiCoO_2$ According to Change of Temperature

The gel precursor (gel precursor with total metal ions to malic acid molar ratio of 2) obtained by procedure of Example 3 was heat-treated at 400, 600, 650 and 700° C. for 1 hour under air to prepare a sample. The chemical composition, Li, Co and C of heat-treated sample was analyzed using ICP and the results thereof is shown in the following Table 1. As shown in the following Table 1, $LiCoO_2$ contained carbon in case of sample calcined at 400 and 600° C. The carbon content in $LiCoO_2$ decreased according to an increase of calcination temperature. It is expected that electric conductivity of $LiCoO_2$ of a sample containing carbon is remarkably increased. The molar ratio of Li and Co of a $LiCoO_2$ sample calcined at various temperature is about 1:1, and that of sample calcined at 700° C. is 1:1.

TABLE 1

Chemical analysis of the $LiCoO_2$ powders calcined at various temperatures for 1 hour under air atmosphere

| Temperature (°C.) | Analytical value (wt %) | | | Approximate chemical composition (carbon) |
|---|---|---|---|---|
| | Li | Co | C | |
| 400 | 6.82 | 56.6 | 0.83 | $Li_{1.02}CoO_{2.01}$ ($C_{0.072}$) |
| 600 | 7.05 | 57.8 | 0.54 | $Li_{1.04}CoO_{2.02}$ ($C_{0.046}$) |

TABLE 1-continued

Chemical analysis of the $LiCoO_2$ powders calcined at various temperatures for 1 hour under air atmosphere

| Temperature (°C.) | Analytical value (wt %) | | | Approximate chemical composition (carbon) |
|---|---|---|---|---|
| | Li | Co | C | |
| 650 | 7.21 | 58.4 | — | $Li_{1.05}CoO_{2.03}$ |
| 700 | 7.10 | 60.0 | — | $Li_{1.00}CoO_{2.00}$ |

X-ray Diffraction Analysis According to Various Temperatures

Figure 3:
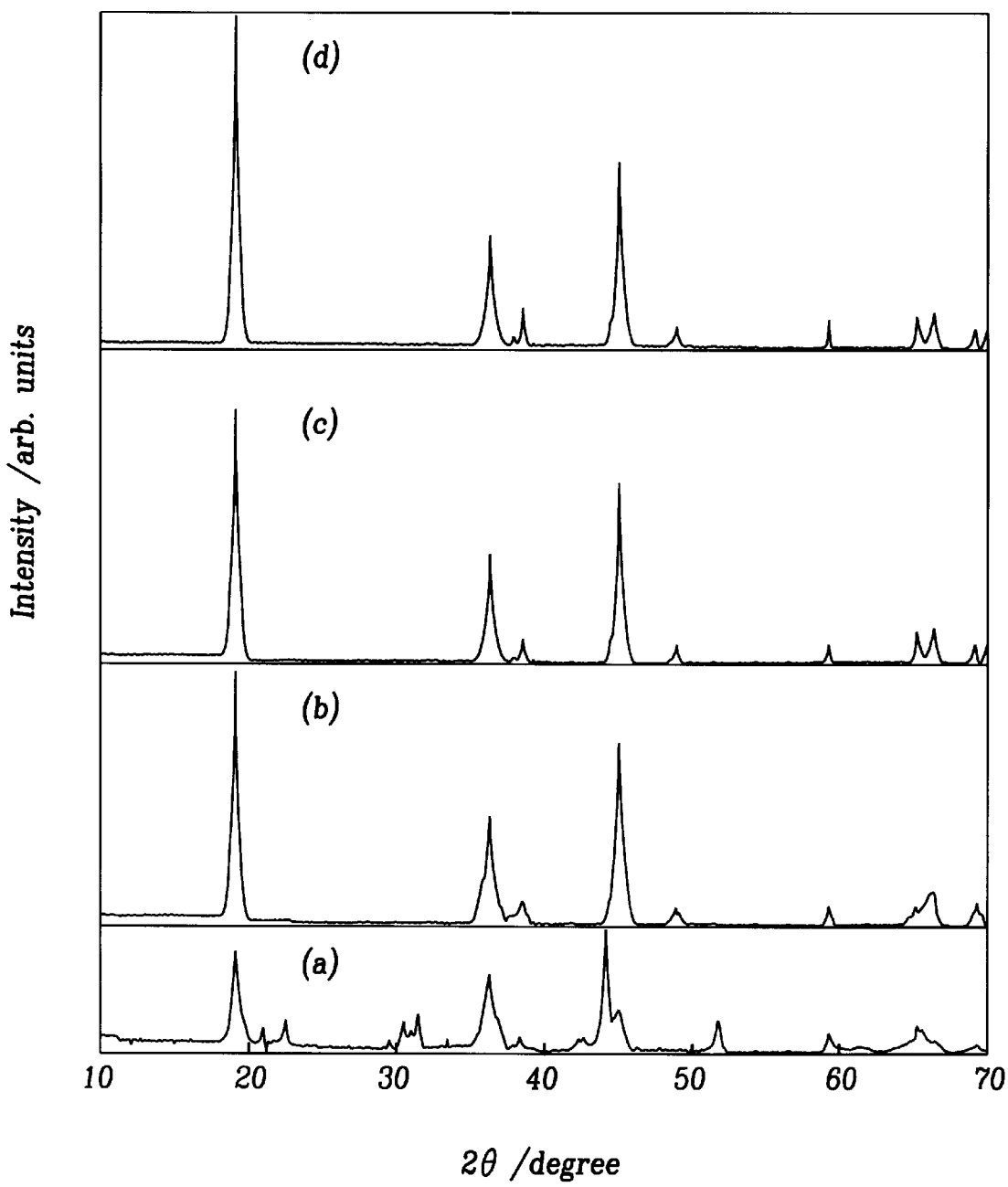
FIGS. 3, 8, 15 and 21 are X-ray diffraction patterns of gel derived material showing the transition procedure from gel precursors to ceramics calcined at various temperatures when $LiCoO_2$ or $LiNiO_2$ is prepared by a sol-gel method.
Figure 8:
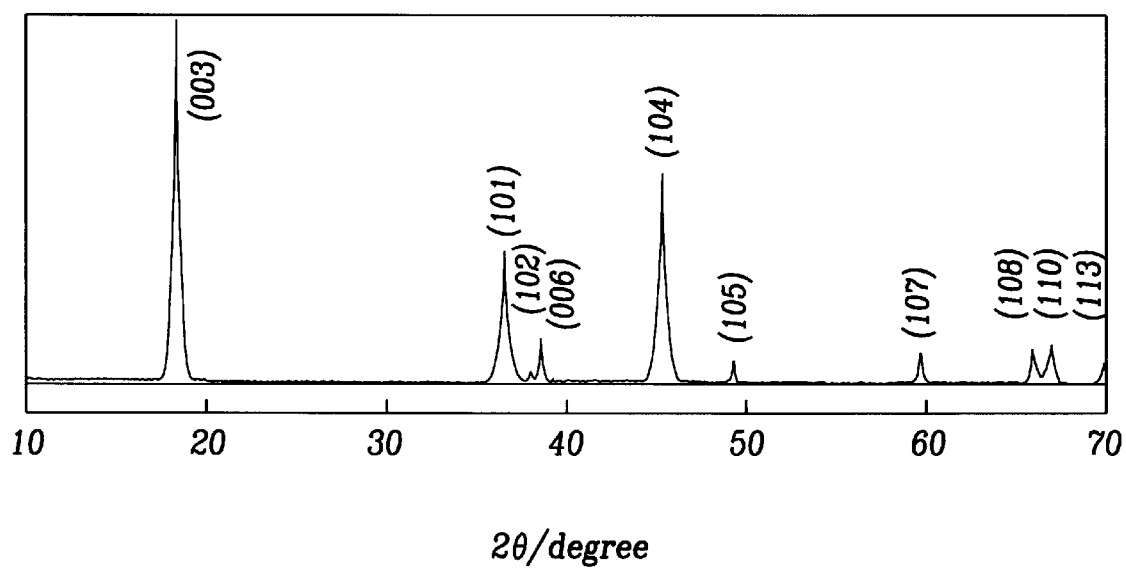

As a result of X-ray diffraction analysis for samples of gel precursor power (the gel precursor was produced with a 1.5 molar ratio of total metal ions to PPA), heated at (a) 300° C., (b) 400° C., (c) 550° C. and 600° C. for a hour under oxidative atmosphere produced in the Example 4, X-ray diffraction patterns are represented in FIG. 3. In FIG. 3, (a) A few impurities appeared as well as $LiCoO_2$ from the sample heated at 300° C., (b) LT-$LiCoO_2$ was produced from the sample calcined at 400° C., which well corresponded with the crystallization (endothermic) peak of the point at 340° C. in the DTA curve. (c) HT-$LiCoO_2$ was produced at 550° C. and (d) as the temperature increased to 600° C., HT-$LiCoO_2$ was produced with sharp peaks of $2\theta=38.4°$ and 59.5°. As a result of X-ray diffraction analysis for samples of gel precursor (the gel precursor was produced with 1 molar ratio of total metal ions to PAA), heated at 700° C. for 10 hours under oxidative atmosphere, X-ray diffraction patterns are represented in FIG. 8. The values of $2\theta$ correspond to crystallized surface of (003), (101), (102), (006), (104), (105), (107), (108), (110), (113), which were increased from the left.

It is appeared that $LiCoO_2$ was produced, which have space group (R3m) of very noticeable crystallizing degree from this XRD form, by standard X-ray diffraction peak of the JCPDS card. The sol-gel method of the present invention required few lower calcining temperatures and shorter time than the conventional solid-state method (this method produces $LiCoO_2$ by sintering at 900° C. for more than 24 hours. The described results of this sol-gel method using PAA as a chelating agent is due to small particle size because a start sample was mixed homogeneously as an atomic size.

Figure 15:
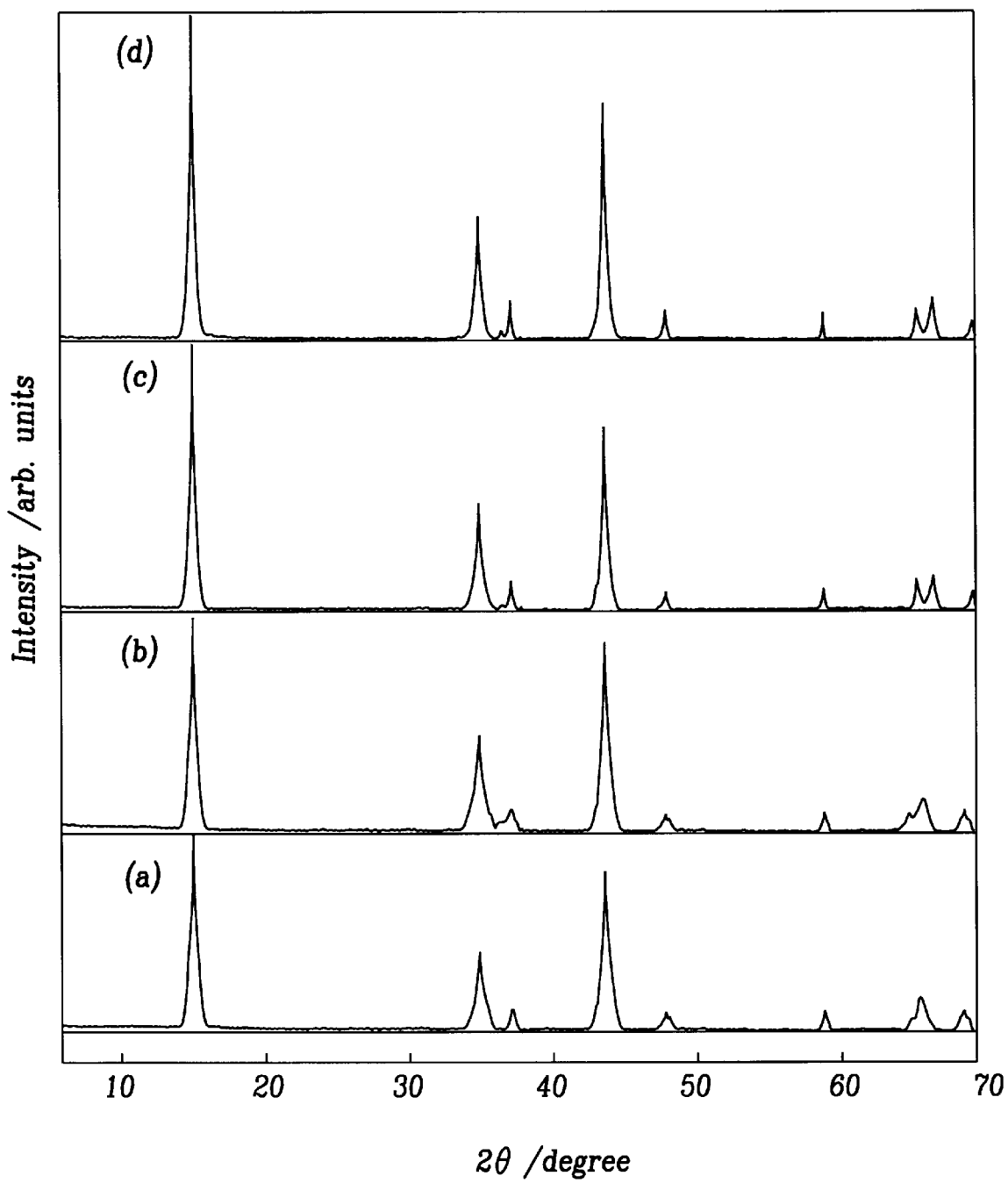

As a result of X-ray diffraction analysis for samples of gel precursor power (the gel precursor was produced with a 1.5 molar ratio of total metal ions to malic acid), heated with (a) 500° C., (b) 600° C., (c) 650° C. and 700° C. during a hour under oxidative atmosphere produced in the example, X-ray diffraction patterns are represented in FIG. 15.

As Shown in FIG. 15, (a) heated at 500° C., $LiCoO_2$ was produced at lower temperatures, although not illustrated in FIG. 15, heated at 400° C., a few impurities and a lot of $LiCoO_2$ was produced at a lower temperature. This corresponds to the crystallization (endothermic) peak at 320° C. of the DTA curve. HT-$LiCoO_2$ (b) was produced in the calcined sample, as the calcining temperature increased to (c) 650° C. and (d) 700° C., HT-$LiCoO_2$ was produced with sharp peaks in $2\theta=38.4°$ and 59.5°. These results represent the sol-gel method of the present invention requiring few lower calcining temperatures and shorter times than the conventional solid-state method which produces $LiCoO_2$ by sintering at 900° C. for more than 24 hours. The sol-gel method using malic acid as a chelating agent results in the described according as a start sample mixed homogeneously in atomic size and this small size improved the sintering property by increasing the reaction velocity of the structural formation.

The Change of the Specific Surface Area According to the Temperature

Figure 4:
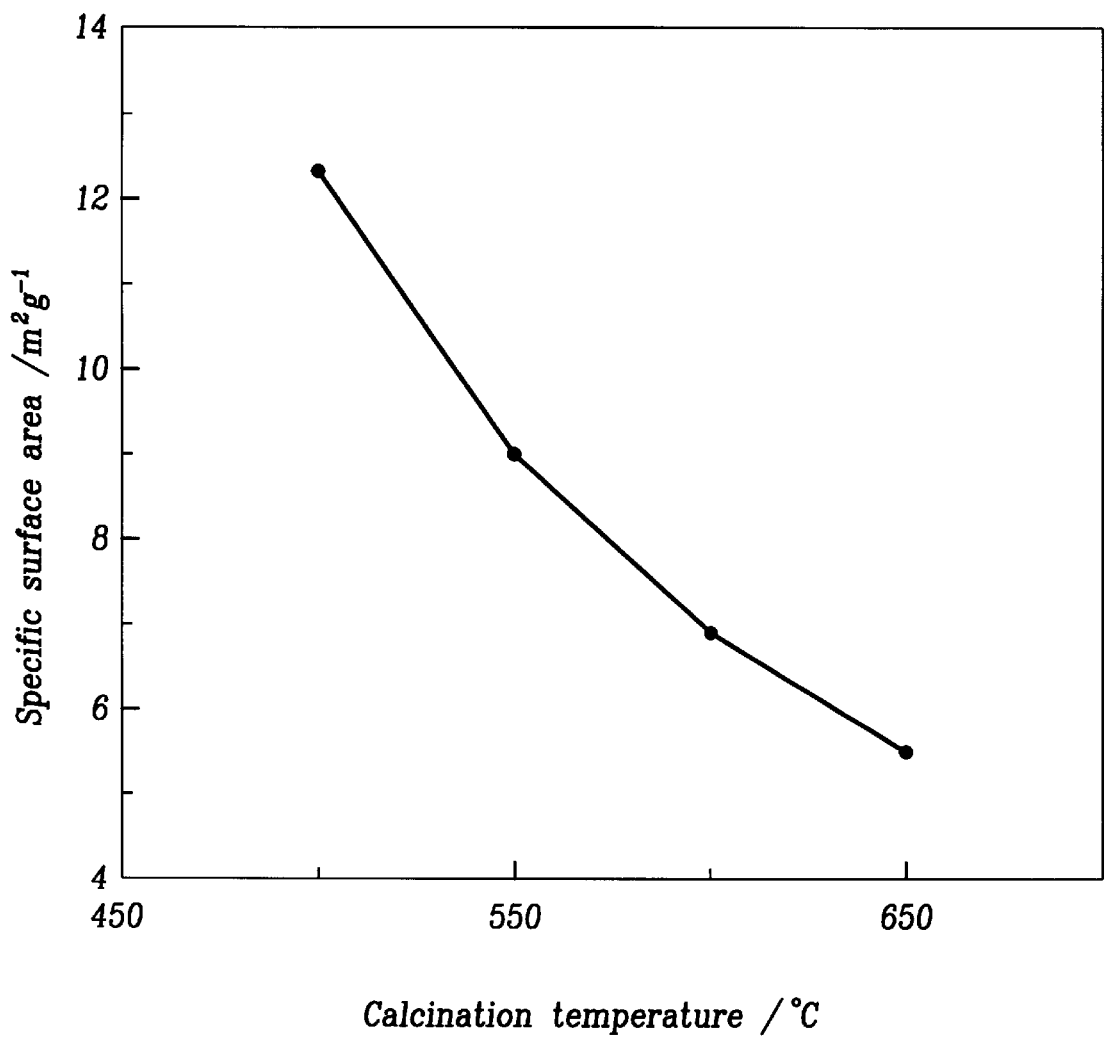
FIGS. 4 and 16 show specific surface area of powder samples prepared by calcining gel precursors at various temperatures when $LiCoO_2$ is prepared by a sol-gel method.

The gel precursors (moral ratio of PAA to total metal ions is 1.5) obtained in the Example 4 were calcined at the temperatures of 500° C., 550° C., 600° C. and 650° C. and the dependence of the specific surface area of the $LiCoO_2$ samples were measured as shown in FIG. 4. In FIG. 4, the specific surface area of the $LiCoO_2$ samples produced according to the present invention linearly decreased according to the increase of the calcination temperature. However, the specific surface area of the $LiCoO_2$ samples according to the present invention was much higher than that of the commercial samples of the Cyprus Foot Mineral Co. (0.21 $m^2/g$). For example, the specific surface area of the HT sample produced after calcining at 550° C. was about 9.0 $m^2/g$ and it was about 42 times higher than that of the Cyprus Foot Mineral Co. In summary, when $LiCoO_2$ according to the present invention was produced at high temperatures, it was confirmed that the $LiCoO_2$ had a high specific surface area owing to a low calcination temperature and a short calcination time.

Figure 16:
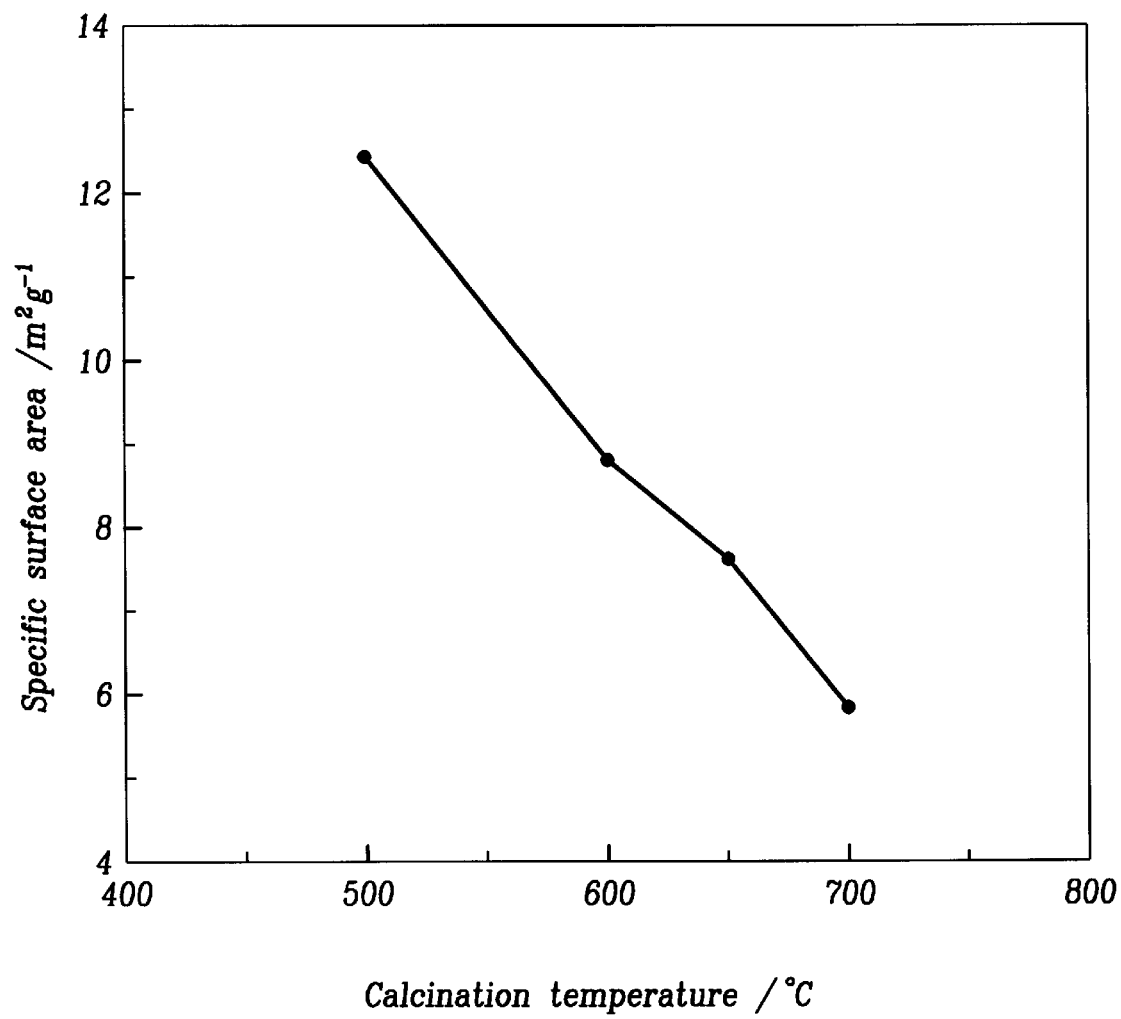

The gel precursors(moral ratio of malic acid to total metal ions is 1.5) obtained in the Example 8 were calcined at the temperatures of 500° C., 550° C., 600° C and 650° C. and the dependence of the specific surface area of the $LiCoO_2$ samples were measured as shown in FIG. 16. In FIG. 16, the specific surface area of the $LiCoO_2$ samples produced according to the present invention linearly decreased according to the increase of the calcination temperature. However, the specific surface area of the $LiCoO_2$ samples according to the present invention was much higher than that of the commercial samples of the Cyprus Foot Mineral Co. (0.21 $m^2/g$). For example, the specific surface LT and HT samples calcined at 500° C. and 600° C. were about 12.4 $m^2/g$ and 8.8 $m^2/g$, respectively and they were about 59 and 42 times higher than that of the Cyprus Foot Mineral Co., respectively. In summary, when $LiCoO_2$ according to the present invention was produced at high temperatures, it was confirmed that $LiCoO_2$ had the high specific surface area owing to a low calcination temperature and a short calcination time.

Figure 5:
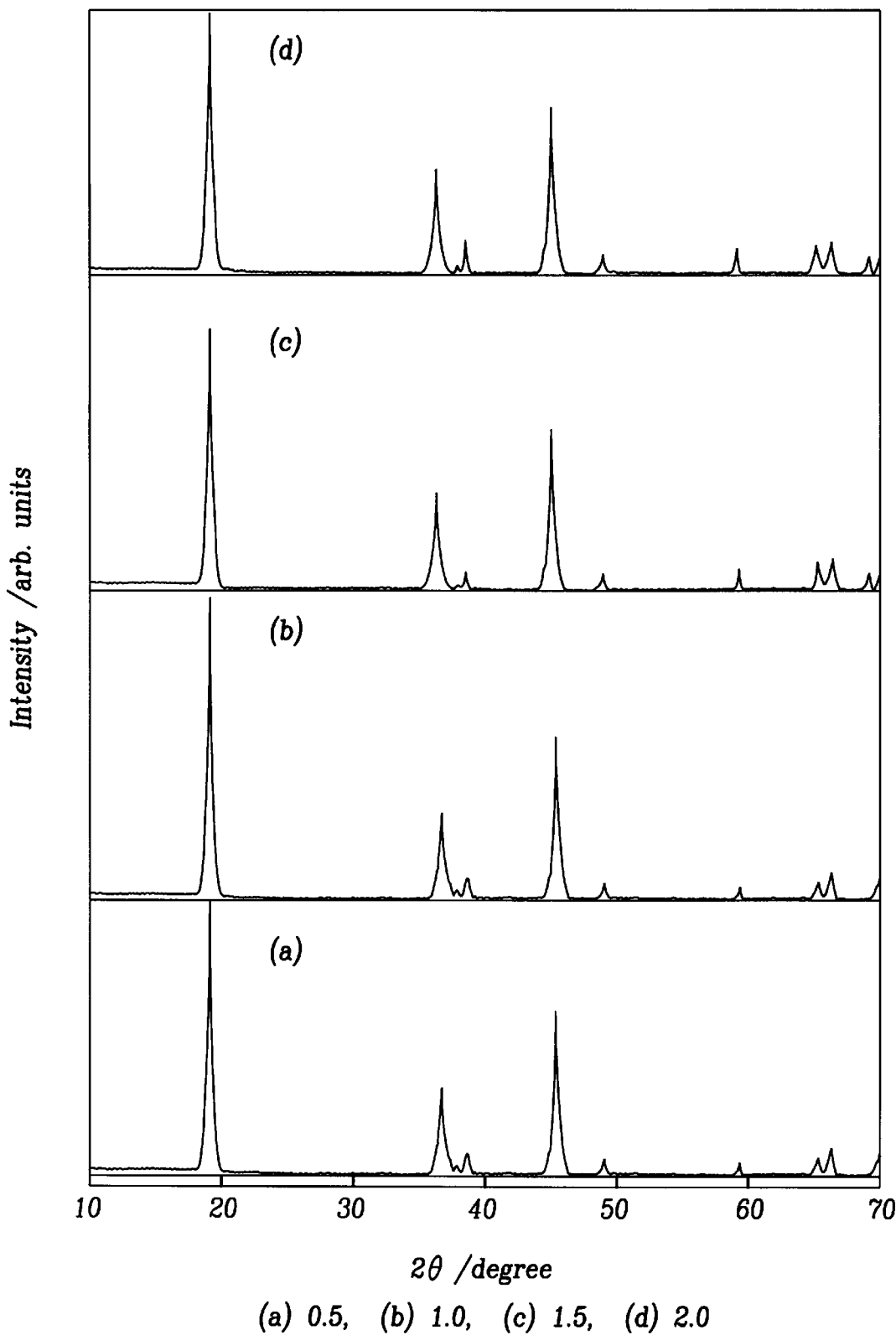
FIGS. 5 and 17 are X-ray diffraction patterns of powder samples prepared by calcining gel precursors of various PAA/metal molar ratio when $LiCoO_2$ is prepared by a sol-gel method.

The X-ray Diffraction Pattern According to the Moral Ratio Change of Chelating Agent to Total Metal Ions The X-ray diffraction pattern of the $LiCoO_2$ samples according to the moral ratio change of PAA to total metal of gel precursor, i.e. PAA to total metal molar ratio of (a) 0.5, (b) 1.0, (c) 1.5 and (d) 2.0 as shown in Example 1 through Example 4, is shown in FIG. 5. Each gel precursor was used after calcining under air atmosphere at 600° C. for 1 hour. As shown in FIG. 5, HT-$LiCoO_2$ was produced apart from the molar ratio change of PAA to total metal of the sample according to the present invention. The crystallinity of the samples was increased according to the increase of the molar ratio of PAA to total metal.

Figure 17:
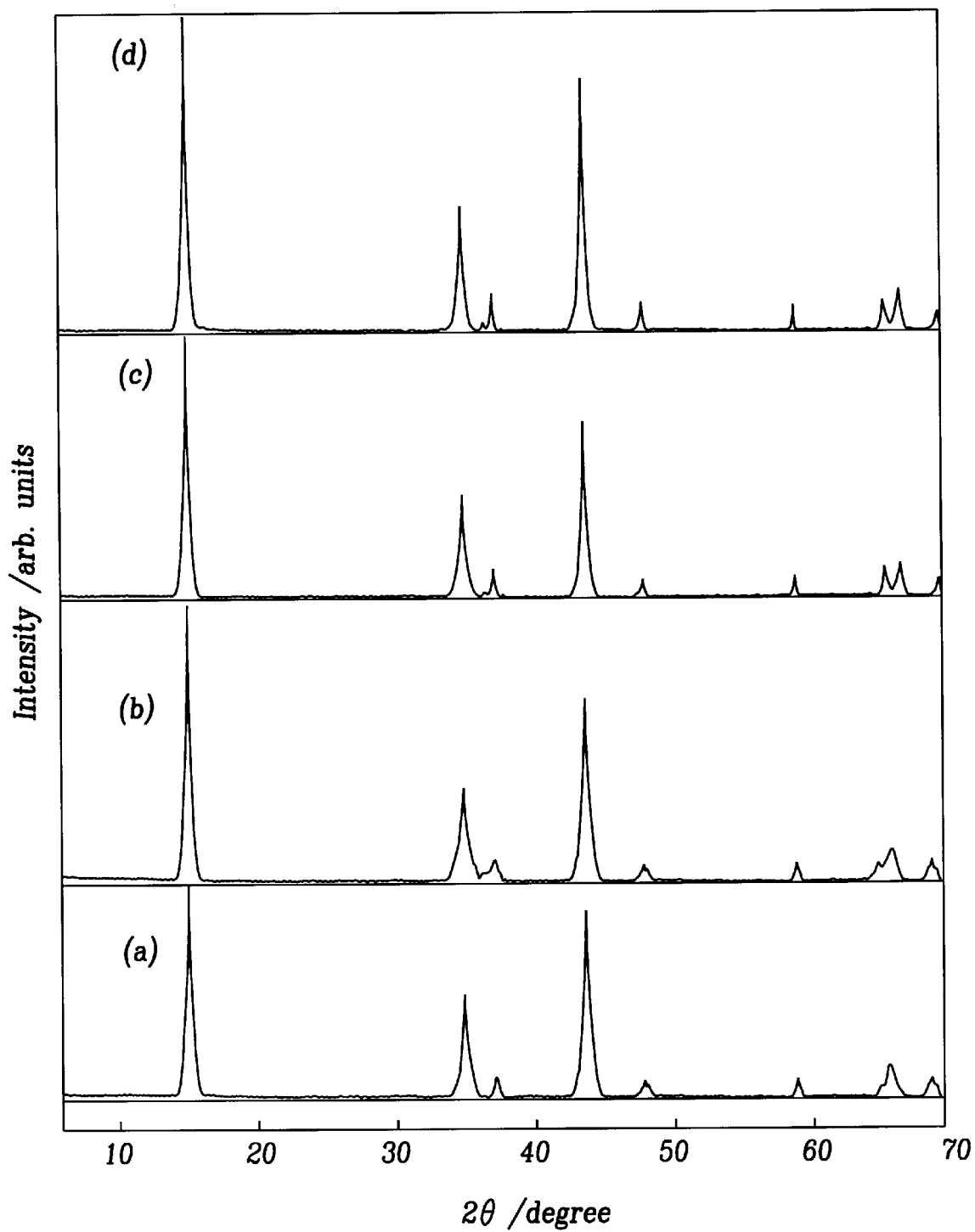
Figure 18A:
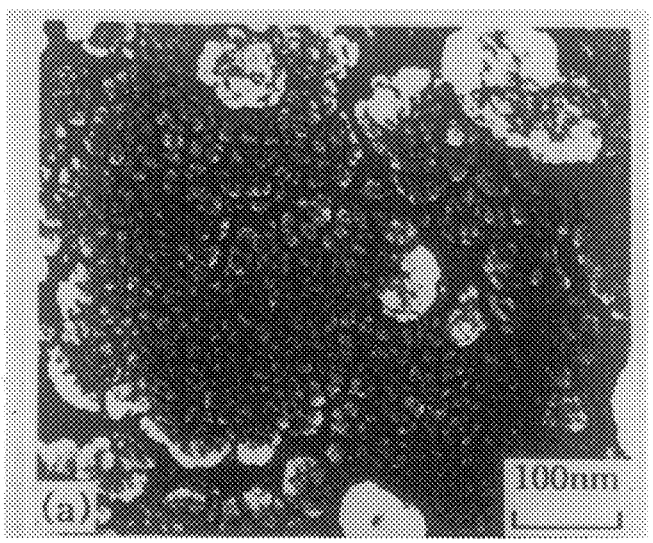
Figure 18B:
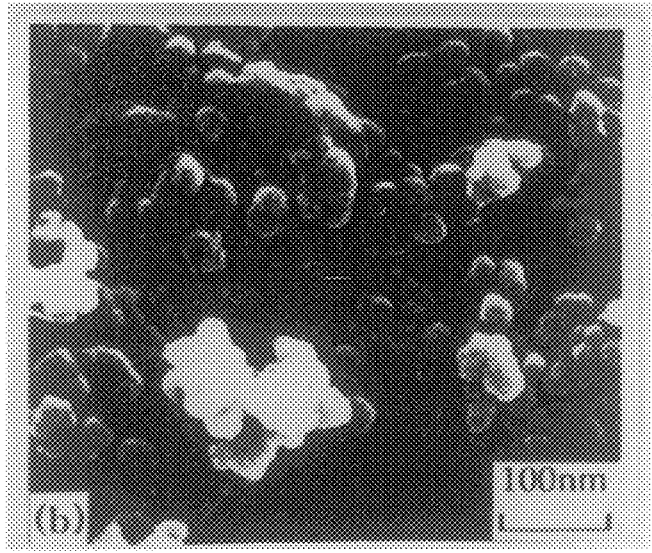
Figure 18C:
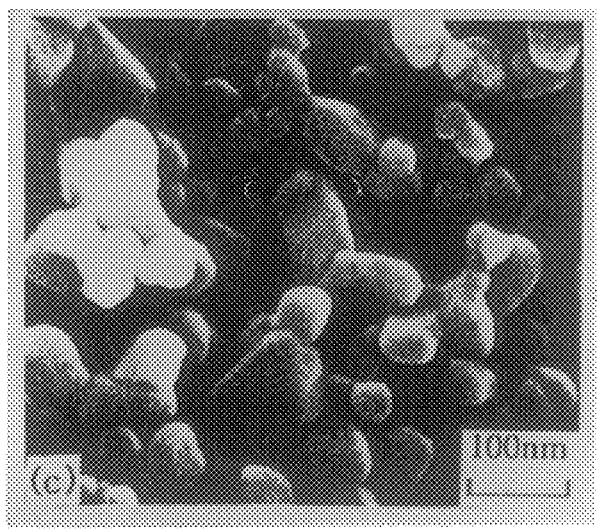

The X-ray diffraction pattern of the $LiCoO_2$ samples according to the moral ratio change of malic acid to total metal of gel precursor, i.e. malic acid to total metal molar ratio of (a) 0.75, (b) 1.0, (c) 1.5 and (d) 2.0 as shown in Example 6 throuth Example 9, is shown in FIG. 17. Each gel precursor was used after calcining under air atmosphere at 600° C. for 1 hour. As shown in FIG. 17, HT-$LiCoO_2$ was produced apart from the molar ratio change of PAA to total metal from the sample according to the present invention. The moral ratio of malic acid to total metal 0.75 was the minimum amount necessary for total metal ions bond on the supposition that metal ions were substituted with hydrogen atoms in —COOH groups in malic acid molecule. The crystallinity of the samples increased according to the increase of the molar ratio of PAA to total metal.

Figure 21:
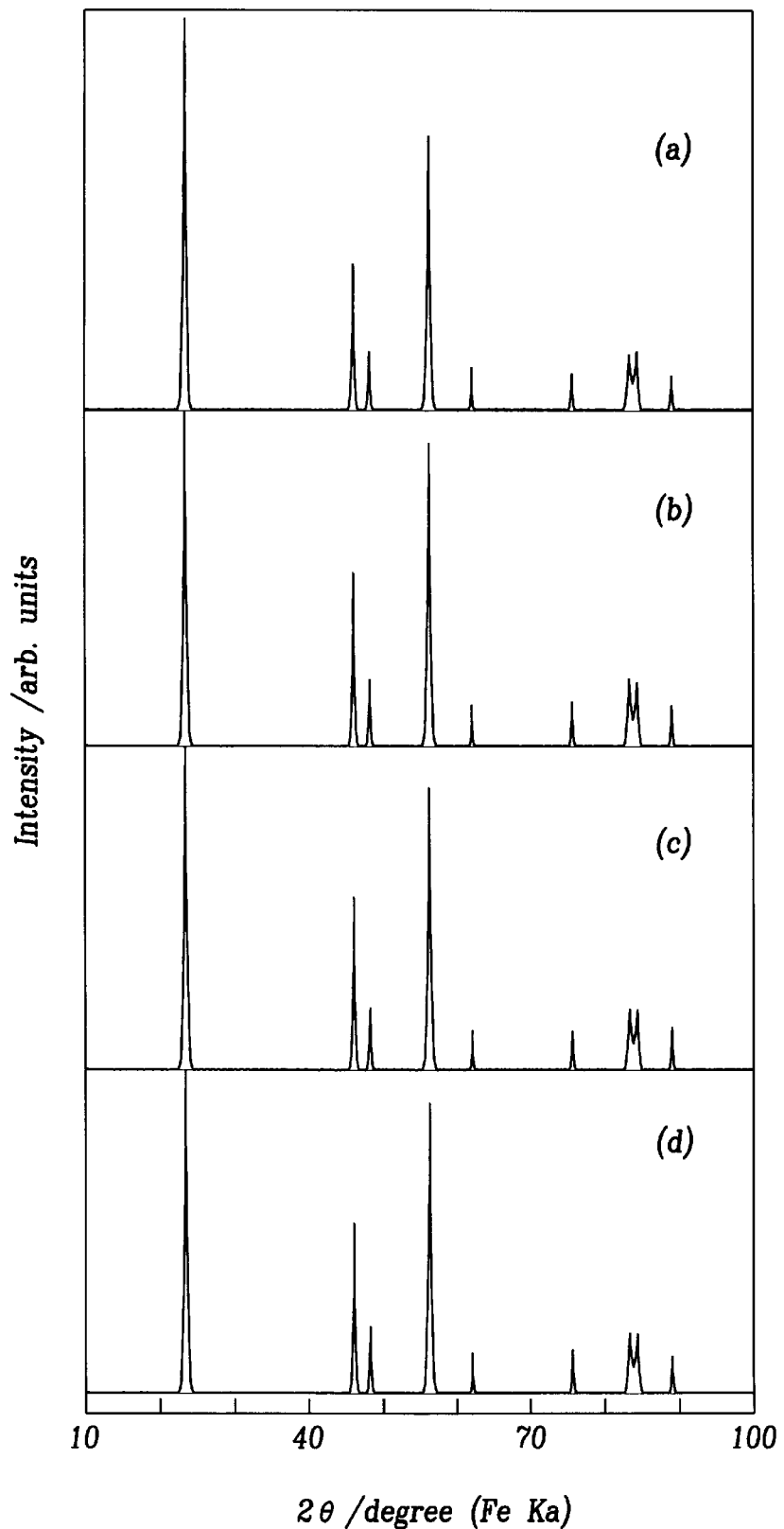

The gel precursors produced at molar ratios of PVB to total metal ions of 1, 2, 3 and 4 were calcined under oxidative atmosphere at 750° C. for 5 hours to obtain powder samples and they were analyzed by X-ray diffraction pattern as shown in FIG. 21. In FIG. 21, it was confirmed that $LiNiO_2$ phase (R3m) was produced apart from the molar ratio of PVB to total metal ion. The reliable and quantitative evaluation to select $LiNiO_2$ with high electrochemical activity using the results of X-ray diffraction pattern were based on the integrated peak ratio of $I_{(003)}/I_{(104)}$ and the peak (108) at 2θ=84.05° and the peak (110) at 2θ=84.55° in the resolution diagram. Namely, the peak ratio of $I_{(003)}/I_{(104)}$ or the resolution of (108) peak and (110) peak are higher, the electrochemical activity of $LiNiO_2$ is higher.

The peak ratios of the $LiNiO_2$ powder sample according to the present invention, nitrate method, spray pyrolysis and solid-state method are shown in Table 2.

TABLE 2

The peak ratio of $I_{(003)}/I_{(104)}$ of $LiNiO_2$

|  | Example 10 | Example 11 | Example 12 | Example 13 | Reference Example 2 | Reference Example 3 | Reference Example 4 |
|---|---|---|---|---|---|---|---|
| $I_{(003)}/I_{(104)}$ | 1.79 | 1.79 | 1.73 | 1.41 | 1.32 | 1.20 | 1.39 |

As shown in Table 2, the $I_{(003)}/I_{(104)}$ peak ratio of the powder samples according to the present invention increased with the decrease of the molar ratio of PVB to total metal ion and was much higher than that of the other methods. For example, the $I_{(003)}/I_{(104)}$ peak ratio of the powder samples produced at the molar ratio of PVB to total metal ion of 1 and 2 was 1.79, which was much higher than that of nitrate method spray pyrolysis and solid-state method. The $I_{(003)}/I_{(104)}$ peak ratio of powder samples according to the nitrate method, spray pyrolysis and solid-state method were 1.32, 1.20 and 1.39, respectively.

The peak resolution of the powder samples according to the present invention was more distinct in comparison with that of the powder samples according to the other methods, by the resolution diagram of (108) peak and (110) peak. The reason thereof was that the starting samples in the process to produce $LiNiO_2$ by sol-gel method according to the present invention were mixed in the homogeneous atom size and the reaction velocity was increased to increase the sintering property.

As shown in the above Table 2, the molar ratio of PVB to total metal ion decreased and the partial pressure of oxygen necessary for the production of $LiNiO_2$ increased to produce $LiNiO_2$ with the structure with a high peak ratio of $I_{(003)}/I_{(104)}$. That is, the crystallinity of $LiNiO_2$ increased according to the decrease in the amount of PVB. The reason why the crystallinity of $LiNiO_2$ is dependent on the amount of PVB is as follows. PVB chelating agent plays a role not only the producer of sol but also the supplier of the heat necessary for the production of $LiNiO_2$ as well as the production of sol. If more amount of PVB is used in the process to produce the gel precursor, the mobility of cations in the crosslinked gel precursor is decreased and the reaction heat necessary for the production of $LiNiO_2$ can be provided. It is confirmed that the more PVB is used, the degree of swelling of the samples calcined at the same calcination temperature is increased. If more than the necessary amount of PVB is used, the calcination temperature abruptly increased during the cleavage of PVB and the partial pressure of oxygen is decreased because of more CO and $CO_2$ to bring an effect contrary to the production of the structure. Therefore, the heating under oxidative atmosphere, i.e. calcination is necessary to synthesize $LiNiO_2$ with a layered structure. In summary, the process for preparing $LiNiO_2$ by the sol-gel method according to the present invention is far superior to that of the nitrate method, spray pyrolysis and solid-state method.

Figure 6:
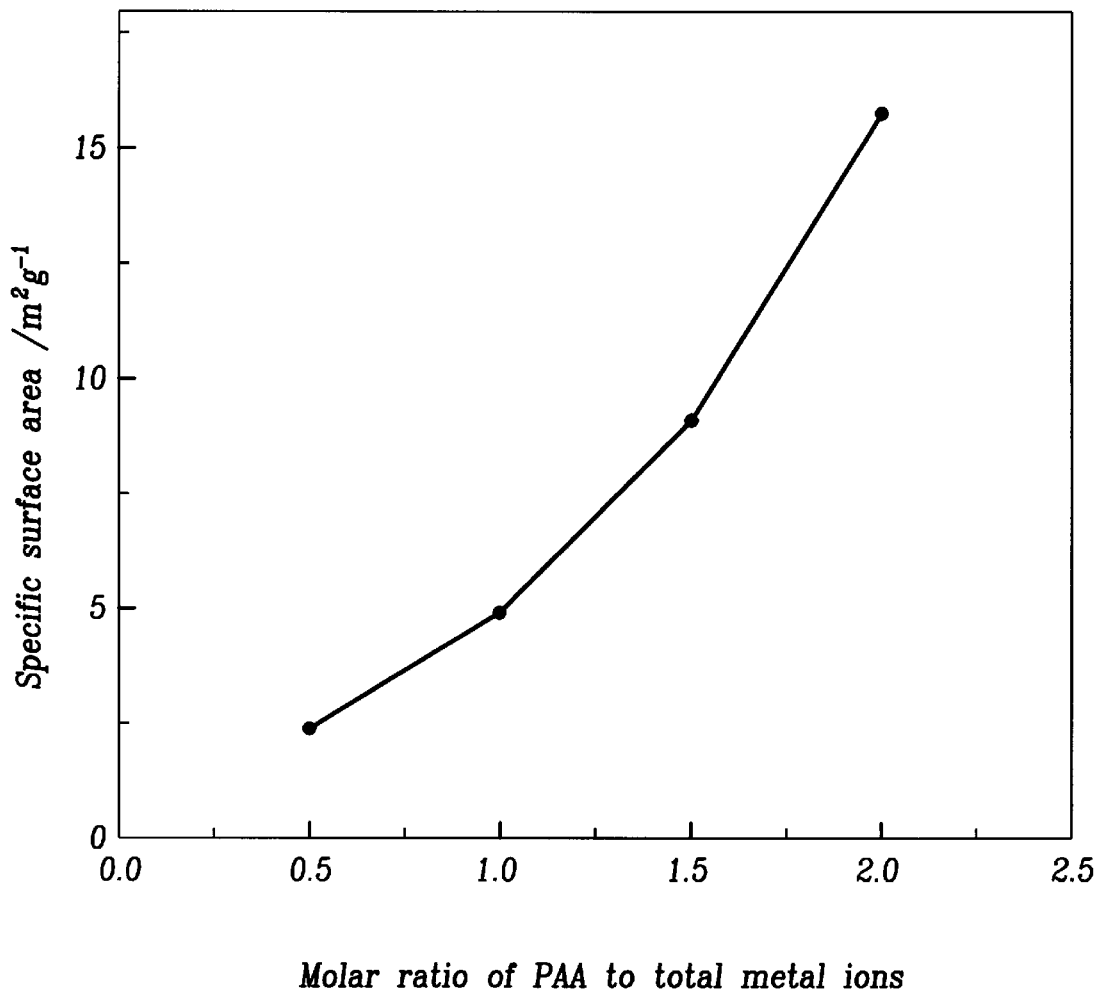
FIG. 6 shows PAA/total metal molar ratio dependence of specific surface area of powder samples prepared by calcining gel precursors when $LiCoO_2$ is prepared by a sol-gel method.

The Change of the Specific Surface Area According to the Molar Ratio of PAA to Total Metal The change of the specific surface area according to the molar ratio of PAA to total metal using each powder from (a) to (d) in the system of the above FIG. 5 was measured as shown in FIG. 6. In FIG. 6, the increase of the molar ratio of PAA to total metal increased the specific surface area of the samples. The specific surface area was 17.4 $m^2/g$ at 2 of molar ratio of PAA to total metal, which was 83 times higher than that of Cyprus Foot Mineral Co. The increase of PAA amount increased the crystallinity and the specific surface area. The reason thereof is as follows. The exothermic peaks corresponding to the cleavage of PAA in the DTA curve of FIG. 2 are shown at 251° C. and 277° C. PAA provides the heat necessary for the production not only for a chelating agent but also $LiNiO_2$. If more amount of PAA is used for the production of the gel precursor, the mobility of cation in the cross-linked gel precursor is decreased and the reaction heat necessary for the production of $LiNiO_2$ can be provided. It was confirmed that the degree of swelling of the samples calcined at the same calcination temperature increased according to the amount of PAA. If more than the necessary amount of PAA is used, the calcination temperature abruptly increased during the cleavage of PAA and the partial pressure of oxygen is decreased because of more CO and $CO_2$ to bring an effect contrary to the production of the structure. On the other hand, if much less amount of PAA is used, the gel can not be produced and not enough reaction heat can be provided to construct the structure. The reverse effect was not observed because PAA amount according to the present invention was not included in this range.

The Change of the Crystallinity According to the Molar Ratio of Malic Acid to Total Metal The crystallinity is increased according to the amount of malic acid. The reason thereof is as follows. Malic acid not only plays a role of a chelating agent for the production of sol, but also gives heat for the production $LiNiO_2$. If more amount of malic acid is used to produce a gel precursor, the cross-linked gel precursor decreases the mobility of cation and the reaction heat necessary for production of $LiNiO_2$ can be provided. It was confirmed that the degree of swelling of the samples calcined at the same calcination temperature increased according to malic acid. If more than the necessary amount of malic acid is used, the calcination temperature abruptly increases during the cleavage of malic acid and the partial pressure of oxygen decreases because of more CO and $CO_2$ to bring an effect contrary to the production of the structure. On the other hand, if much less amount of malic acid is used, not enough reaction heat can be provided to construct the structure. The reverse effect was not observed because malic acid amount according to the present invention was not included in this range.

The SEM Photograph of the Sample According to the Present Invention

Figure 7A:
FIGS. 7, 9, 18 and 22 are Scanning Electron Micrographs of powder samples when $LiCoO_2$ or $LiNiO_2$ is prepared by a sol-gel method.
Figure 7B:

The SEM photographs of the samples after calcination at (a) 550° C. and (b) 600° C. of the gel precursor obtained in the Example 2, is shown in FIG. 7. The surface of the sample calcined at (a) 550° C. consisted of homogeneous small particles with the average diameter of 30 nm. A bit of cohesion was observed in the photograph of the sample heated at 600° C. and the average diameter thereof was 50 nm. The diameter of $HT-LiCoO_2$ powder according to the present invention was 30–50 nm and was much smaller than that of the $HT-LiCoO_2$ powder of the comparative example (5–10 $\mu$m).

Figure 9A:
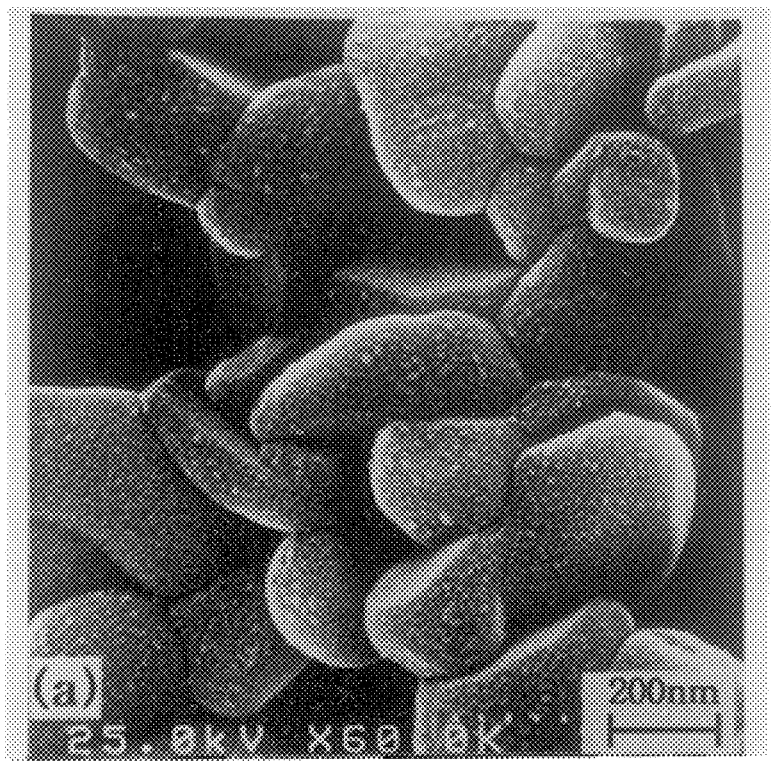
Figure 9B:
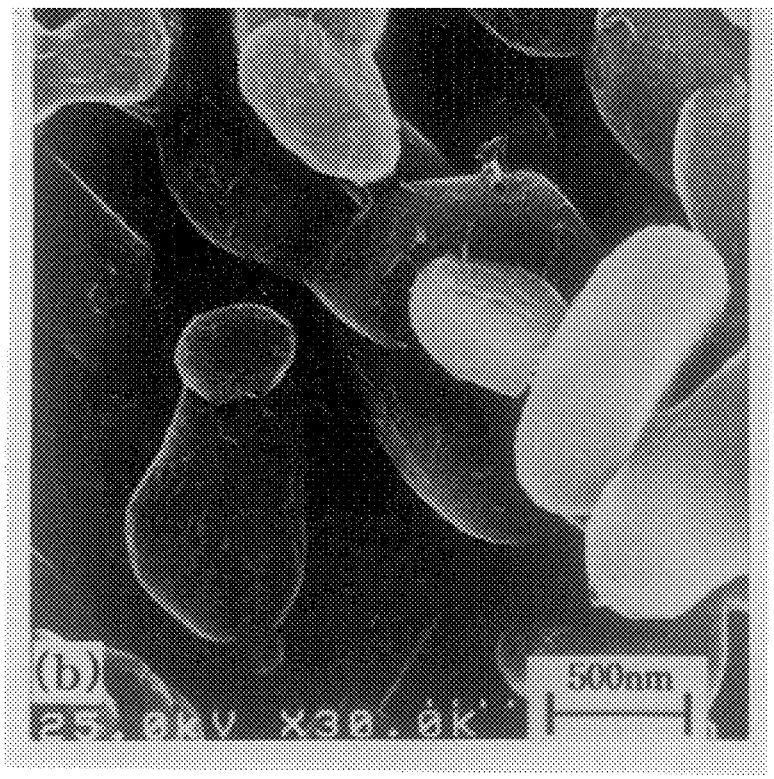

The SEM photographs of the samples after calcination at (a) 750° C. and (b) 800° C. of the gel precursor obtained in the Example 3, is shown in FIG. 9. The surface of the sample calcined at (a) 750° C. consisted of homogeneous small particles with the average diameter of 500 nm. The average diameter of the sample heated at 800° C. was 1 $\mu$m. The diameter of $HT-LiCoO_2$ powder according to the present invention was much smaller than that of the $HT-LiCoO_2$ powder of the comparative example.

The SEM photographs of the samples after calcination at (a) 500° C., (b) 600° C. and (c) 700° C. of the gel precursor obtained in the Example 18, is shown in FIG. 7. The $LT-LiCoO_2$ sample calcined at (a) 500° C. consisted of homogeneous small particles with the average diameter of 30 nm. A bit of cohesion was observed in the photograph of the $HT-LiCoO_2$ sample heated at (b) 600° C. and (c) 700° C., and the average diameters thereof were 60 nm and 100 nm, respectively. The diameter of $HT-LiCoO_2$ powder according to the present invention was 30–100 nm and it was much smaller than that of the $HT-LiCoO_2$ powder of the comparative example (5–10 $\mu$m).

Figure 22:
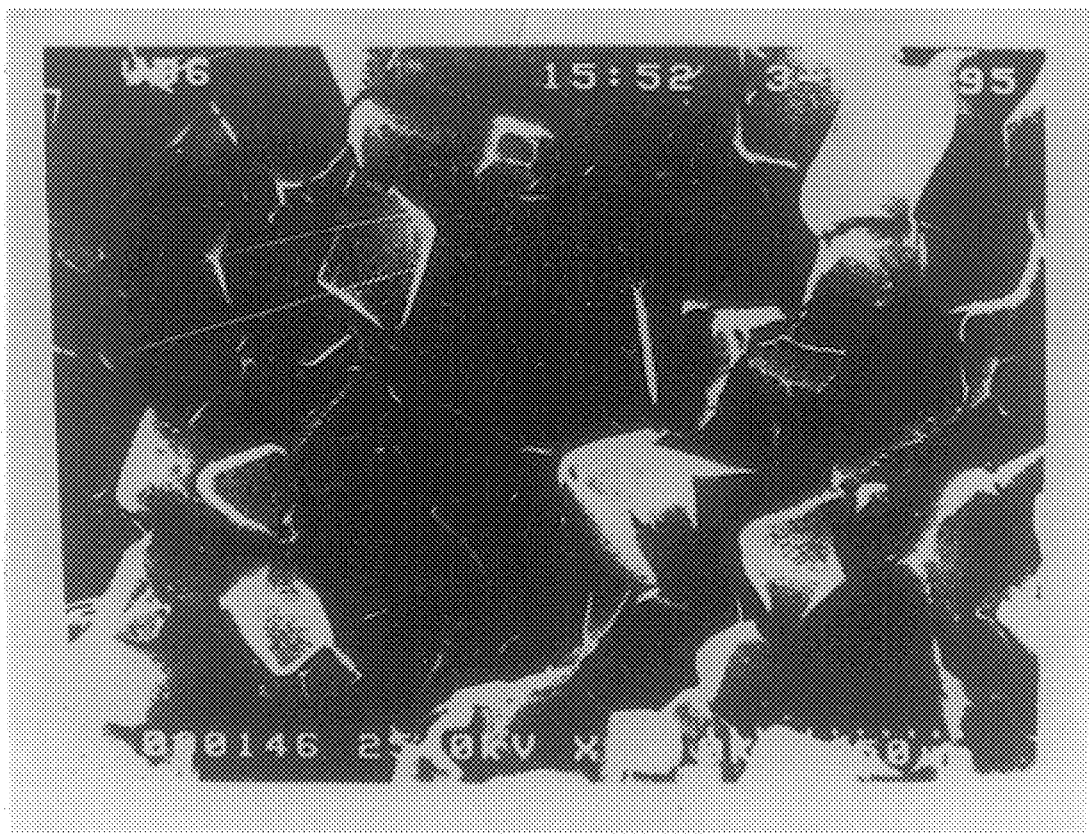

The surface of the $LiNiO_2$ powder sample obtained by Example 11, of which the molar ratio of PVB to total metal was 2, was analyzed by SEM (Scanning Electron Microscope) as shown in FIG. 22. The diameter of the commercial $LiNiO_2$ powder was 1–10 $\mu$m and the diameter distribution thereof was very wide. However, the diameter of the $LiNiO_2$ powder sample according to the present invention was 0.75–1.5 $\mu$m and was extremely homogeneous. Consequently, the $LiNiO_2$ powder sample improves the quality of the electrode cells.

The Galvanostatic Charge-Discharge Curve

The lithium electrode cell was produced using the precursor powder obtained by Example 3. The process thereof is as follows:

5 weight of vulcan XC-72 carbon black which acts as a conductive material and has the specific surface area of 250 $m^2/g$, 3 weight of polyvinylidene fluoride (PVDF) as a binder were added to the $LiCoO_2$ powder to produce a cathode composition. PVDF was thoroughly dissolved in a NMF (n-methyl pyrrolidone) organic solvent. The active material and the conductive material were added and mixed to prepare a paste and it was coated on 316 stainless steel ex-met (U.S.A.) and dried in a vacuum. The solution which had the molar ratio of ethylene carbonate dissolved in 1M of $LiPF_6$ as a electrolyte and DEC (diethyl carbonate) of 1:1, was used. $LiPF_6$, as a lithium salt, was used after drying for 12 hours at 120° C. EC and DEC, as a solvent, were used after pretreatment with a molecular sieve of 4 Å treated by activation for 2 hours in order to minimize the content of water. Lithium metal foil of 99.999% purity was used as a reference and counter electrodes and the charge-discharge experiment was carried out in the VAC HE-493 glove box.

Figure 10:
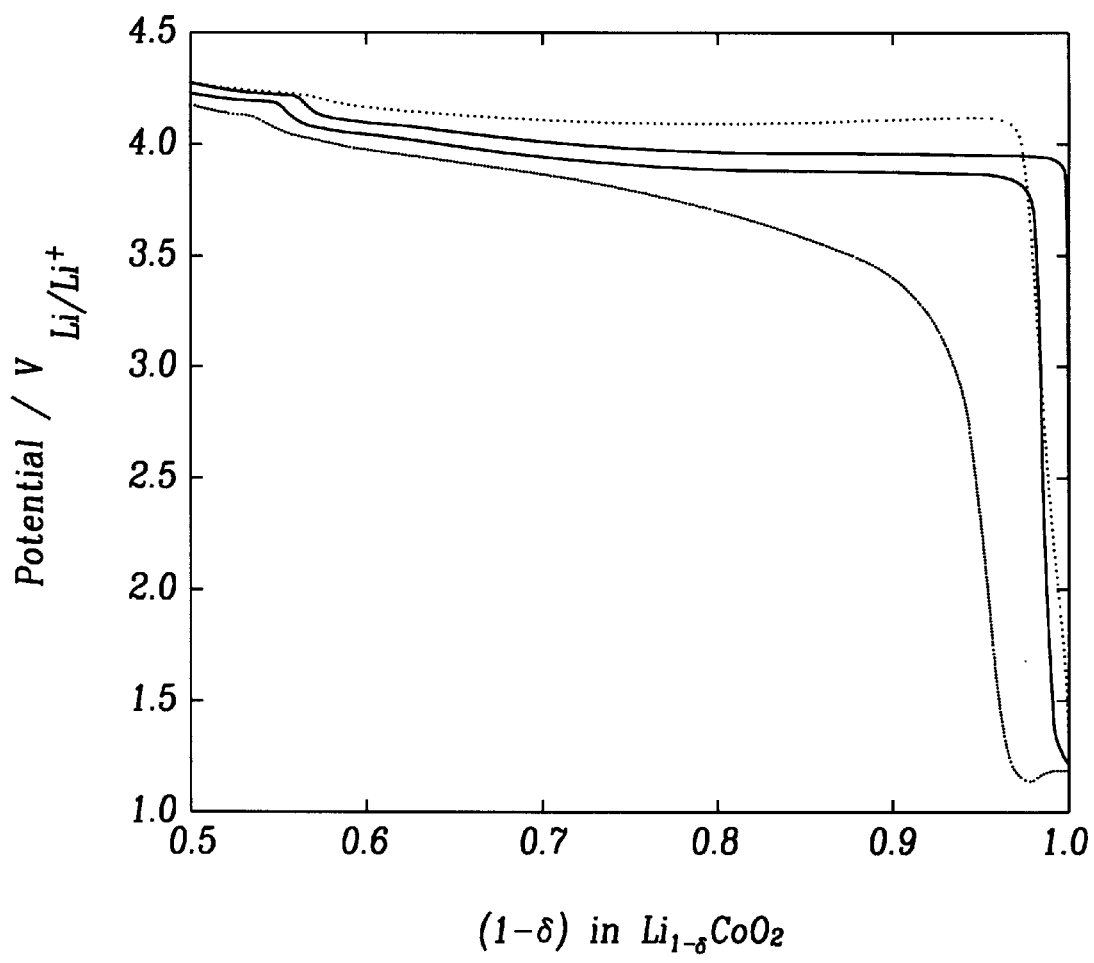
FIG. 10 shows galvanostatic charge-discharge curves for a $LiCoO_2$ cell according to the intercalated lithium, wherein "———" represents the present invention, and "- - -" represents Cyprus (U.S.A.).

FIG. 10 shows the galvanostatic charge-discharge curve according to the lithium content (1-δ) in the $LiCoO_2$ electrode produced by the above process. The first charge-discharge experiment was carried out under a constant condition for 10 hours rate using the sample according to the present invention and commercial sample of Cyprus (U.S.A.) in a $Li/LiCoO_2$ cell in 1 M $LiPF_6$ solution dissolved in EC and DEC. The lithium content was calculated from the mass of a cathode active material and total charge. The wide potential plateau region was observed in the region 3.8–4.2 $V_{Li/Li+}$ of the charge-discharge curve. The width of this potential plateau region determined the capacity of the electrode cell. Little hysterisis (which determines the efficiency of the electrode cell) of the sample according to the present invention was observed. The order-disorder phenomenon definitely was observed in the $LiCoO_2$ electrode cell at 0.55 of lithium content. The order-disorder phenomenon demonstrated the reorientation of the structure of $LiCoO_2$ active material in the process of intercalation/deintercalation of lithium ion. The long cycle life was estimated by the order/disorder phenomenon. In the meantime, the charge-discharge hystersis of $LiCoO_2$ electrode of Cyprus Co. was exceedingly large. The order-disorder was not observed in $LiCoO_2$ electrode cell at 0.55 of lithium content.

Cycle Life Dependence of Constant Current Curve

Figure 11:
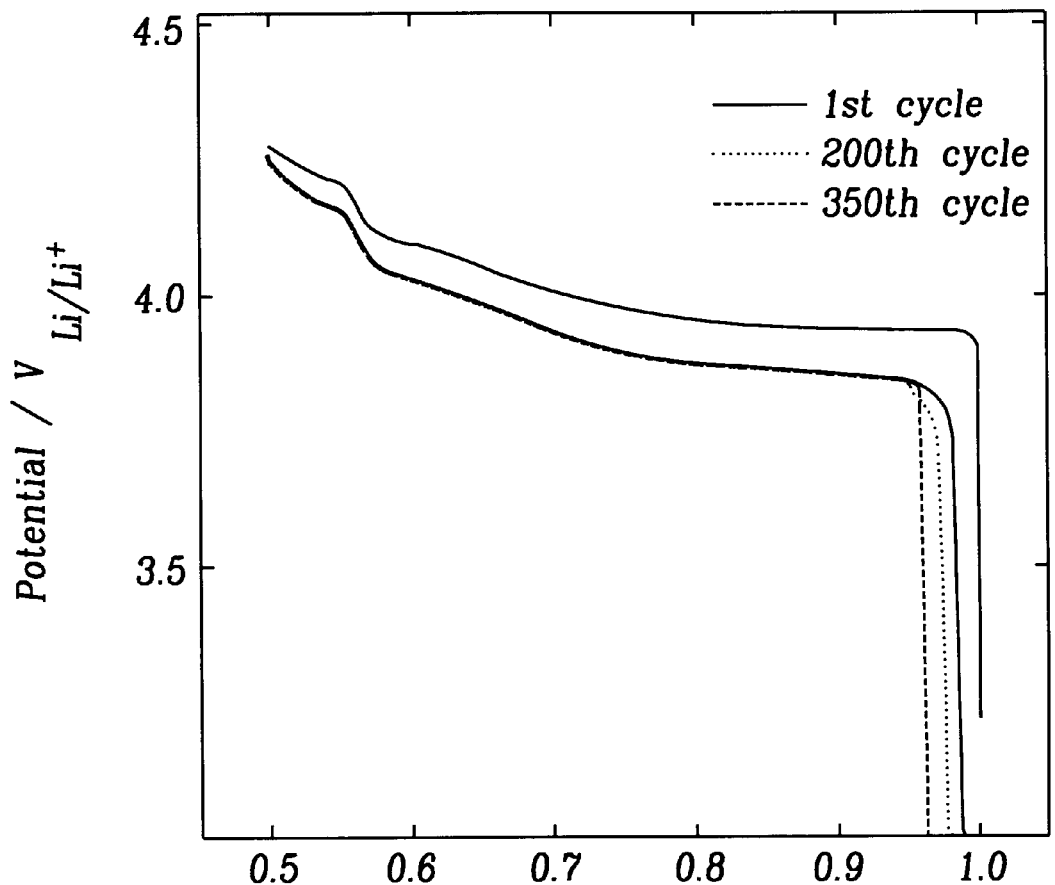
FIG. 11 shows cycling behavior over galvanostatic discharge curves for a $LiCoO_2$ cell according to the intercalated lithium.

FIG. 11 shows the cycle life dependence of a constant current curve according to intercalated lithium content of $LiCoO_2$ electrode. $Li/LiCoO_2$ cell is operated in EC and DEC solution comprising 1M LiF6 in 2 hr rate (current density: 0.137 A/g). Said condition corresponds to the charge and discharge condition when the cell is actually used. Order-disorder phenomenon of $LiCoO_2$ electrode is maintained well in lithium content 0.55, though little capacity decrease occurred according to cycle life.

The Change of Discharge Capacity According to Cycle Life

Figure 12:
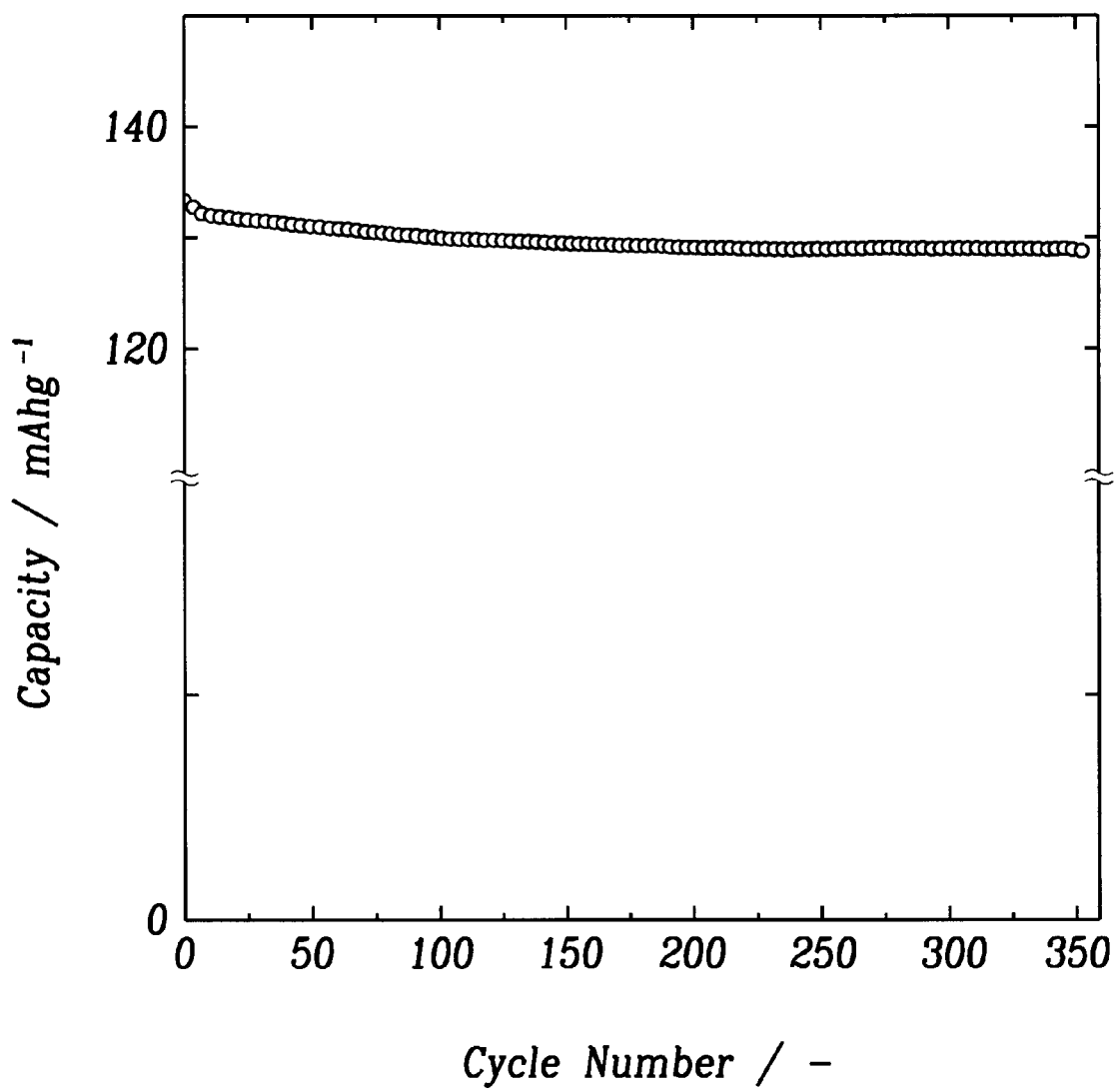
FIG. 12 shows discharge capacity vs. cycle number for a $LiCoO_2$ cell.

FIG. 12 shows the change of discharge capacity of $LiCoO_2$ electrode according to cycle life. The capacity of the $LiCoO_2$ electrode slowly decreased after each cycle. The first discharge capacity is 132.7 mAh/g and the 350th discharge capacity is 128.2 mAh/g, maintaining 96.6% of the first discharge capacity. In Sony's patent (pyoung4-249074: Solid state method, Control of Oxygen pressure fraction, voltage range: 4.1–2.75 V, 2 hr discharge, initial capacity: the 10th capacity, anode: lithium metal), maintains the initial capacity in the 200th cycle and the capacity of the 350th cycle, by linear extrapolation to compare with results of this invention, is 95.6%. Considering the commercialization of Sony's lithium ionic cell, expect the commercialization of $LiCoO_2$ active material and electrode which are prepared in this invention.

As mentioned above, comparing the manufacturing method for $LiCoO_2$ according to one example which uses PAA as a chelating agent in this invention in that high temperature (HT)-$LiCoO_2$ can be manufactured at 550° C. for 24 hours and low temperature (LT)- $LiCoO_2$ can be manufactured at 400° C. for 1 hour with the conventional preparation for $LiCoO_2$ according to the comparative example of the solid state reaction method in that high temperature (HT)-$LiCoO_2$ can be manufactured at 900° C. for 24 hours and low temperature (LT)-$LiCoO_2$ can be manufactured at 400° C. for 1 week, the former is convenient and economical. Besides, comparing the particle size (30–50 nm) and specific surface (17 m2/g) of HT-$LiCoO_2$ powder, which is manufactured by the example of this invention, with the particle size (5–10 μm) and specific surface(0.21–0.63 m$^2$/g) of HT-$LiCoO_2$ powder, which is manufactured by the comparative example of a conventional art, the former is very small and has a higher specific surface. The above mentioned $LiCoO_2$ is microscopic powder and has a higher specific surface which is manufactured by this invention. Accordingly, If the powder is used in a lithium secondary cell or positive material in a melting carbonate fuel cell, the electromagnetic, electrochemical, and mechanical physical property of them will improve.

Besides, comparing the manufacturing method for $LiCoO_2$ according to one example which uses malic acid as a chelating agent in this invention in that high temperature (HT)-$LiCoO_2$ can be manufactured at 600° C. for 1 hour and low temperature (LT)-$LiCoO_2$ can be manufactured for at 500° for 1 hour with the conventional preparation for $LiCoO_2$ according to the comparative example of the solid state reaction method in that high temperature (HT)-$LiCoO_2$ can be manufactured at 900° C. for 24 hours and low temperature (LT)-$LiCoO_2$ can be manufactured at 400° C. for 1 week, the former is convenient and economical. Besides, comparing the particle size (30–100 nm) and specific surface (6–12.4 m$^2$/g) of HT-$LiCoO_2$ powder, which is manufactured by the example of this invention with particle size(5–10 μm) and specific surface(0.21–0.63 m$^2$/g) of HT-$LiCoO_2$ powder, which is manufactured by the comparative example of conventional art, the former is very small and has a higher specific surface. Accordingly, If the powder is used in a lithium secondary cell or positive material in a melting carbonate fuel cell, the physical property such as electromagnetic, electrochemical, and mechanical property of them will improve.

$LiCoO_2$ sol, $LiCoO_2$ gel precursor and $LiCoO_2$ precursor powder can be stored as it is respectively and manufactured $LiCoO_2$ by heating, calcining in the desired temperature and time, which are manufactured by $LiCoO_2$ sol preparation, $LiCoO_2$ gel precursor preparation and $LiCoO_2$ precursor powder preparation according to this invention.

What is claimed is:

1. A process for preparing $LiCoO_2$ comprising the steps of:

mixing aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of polyacrylic acid to produce a mixed aqueous solution;

controlling the pH of said mixed aqueous solution between 1 to 4;

heating said mixed aqueous solution from 50 to 90° C. to produce a sol;

heating said sol from 50 to 90° C. to produce a gel precursor;

heating said gel precursor above 300° C. to produce a precursor powder; and calcining said precursor powder from 400 to 900° C.

2. A process for preparing $LiCoO_2$ comprising the steps of:

mixing an aqueous solution of a metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of malic acid to produce a mixed aqueous solution;

controlling the pH of said mixed aqueous solution between 4.5 to 5.5;

heating said mixed aqueous solution from 50 to 90° C. to produce a sol;

heating said sol from 50 to 90° C. to produce a gel precursor;

heating said gel precursor above 400° C. to produce a precursor powder; and calcining said precursor powder from 500 to 900° C.

3. The process for preparing $LiCoO_2$ as claimed in claim 1, wherein said metal salt aqueous solution is prepared by dissolving $CH_3COOLi.2H_2O$; and $Co(NO_3)_2.6H_2O$ in water.

4. The process for preparing $LiCoO_2$ as claimed in claim 1, wherein the molar ratio of lithium nitrate or lithium acetate to cobalt nitrate or cobalt acetate is 1 to 1.2:1.

5. The process for preparing $LiCoO_2$ as claimed in claim 1, wherein said precursor powder is calcined from 400 to 600° C.

6. The process for preparing $LiCoO_2$ as claimed in claim 1, wherein the molar ratio of total metal ions to polyacrylic acid is above 0.25.

7. The process for preparing $LiCoO_2$ as claimed in claim 1, wherein the calcination is performed under oxidative atmosphere.

8. The process for preparing $LiCoO_2$ as claimed in claim 1, wherein the step of controlling the pH of said mixed aqueous solution is performed by adding nitric acid in a dropwise manner.

9. The process for preparing $LiCoO_2$ as claimed in claim 2, said metal salt aqueous solution is prepared by dissolving $CH_3COOLi.2H_2O$ and $Co(NO_3)_2.6H_2O$ in water.

10. The process for preparing $LiCoO_2$ as claimed in claim 2, wherein the molar ratio of lithium nitrate or lithium acetate to cobalt nitrate or cobalt acetate is 1 to 1.2:1.

11. The process for preparing $LiCoO_2$ as claimed in claim 2, wherein said precursor powder is calcined from 600 to 900° C.

12. The process for preparing $LiCoO_2$ as claimed in claim 2, wherein the molar ratio of total metal ions to malic acid is above 0.5.

13. The process for preparing $LiCoO_2$ as claimed in claim 2, wherein the calcination is performed under oxidative atmosphere.

14. A process for preparing $LiCoO_2$ sol comprising the steps of:

mixing an aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of polyacrylic acid to produce a mixed aqueous solution;

controlling the pH of said mixed aqueous solution between 1 to 2; and heating said mixed aqueous solution from 50 to 90° C. to produce a sol.

15. A process for preparing $LiCoO_2$ gel precursor comprising the steps of:

mixing an aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of polyacrylic acid to produce a mixed aqueous solution;

controlling the pH of said mixed aqueous solution between 1 to 4;

heating said mixed aqueous solution from 50 to 90° C. to produce a sol; and heating said sol from 50 to 90° C. to produce a gel precursor.

16. A process for preparing $LiCoO_2$ precursor powder comprising the steps of:

mixing an aqueous solution of metal salt prepared by dissolving a first compound selected from the group consisting of lithium nitrate, lithium acetate and lithium hydroxide and a second compound selected from the group consisting of cobalt nitrate, cobalt acetate, cobalt oxide and cobalt hydroxide in water with an aqueous solution of polyacrylic acid to produce a mixed aqueous solution;

controlling the pH of said mixed aqueous solution between 1 to 4;

heating said mixed aqueous solution from 50 to 90° C. to produce a sol;

heating said sol from 50 to 90° C. to produce a gel precursor; and heating said gel precursor above 300° C. to produce a precursor powder.

17. A process for preparing $LiCoO_2$ sol comprising the steps of:

mixing an aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of malic acid to produce a mixed aqueous solution;

controlling the pH of said mixed aqueous solution between 4.5 to 5.5; and heating said mixed aqueous solution from 50 to 90° C. to produce a sol.

18. A process for preparing $LiCoO_2$ gel precursor comprising the steps of:

mixing an aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of inalic acid aqueous solution to produce a mixed aqueous solution;

controlling the pH of said mixed aqueous solution between 4.5 to 5.5;

heating said mixed aqueous solution from 50 to 90° C. to produce a sol; and heating said sol from 50 to 90° C. to produce a gel precursor.

19. A process for preparing $LiCoO_2$ precursor powder comprising the steps of:

mixing an aqueous solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in water with an aqueous solution of malic acid to produce a mixed aqueous solution;

controlling the pal of said mixed aqueous solution between 4.5 to 5.5;

heating said mixed aqueous solution from 50 to 90° C. to produce a sol;

heating said sol from 50 to 90° C. to produce a gel precursor; and heating said gel precursor above 400° C. to produce a precursor powder.

20. A process for preparing $LiNiO_2$ comprising the steps of:

mixing an ethanol solution of metal salt prepared by dissolving a first compound selected from the group consisting of lithium nitrate, lithium acetate and lithium hydroxide and a second compound selected from the group consisting of nickel nitrate, nickel acetate, nickel oxide and nickel hydroxide in an ethanol solution with an ethanol solution of polyvinyl butyral to produce a mixed solution;

heating said mixed solution from 70 to 80° C. to produce a sol;

heating said sol from 70 to 80° C. to produce a gel precursor;

heating said gel precursor above 500° C. to produce a precursor powder; and calcining said precursor powder from 600 to 900° C.

21. The process for preparing $LiNiO_2$ as claimed in claim 20, wherein the mixing molar ratio of said first compound to said second compound is 1 to 1.2:1.

22. The process for preparing $LiNiO_2$ as claimed in claim 20, wherein the molar ratio of total metal ions to polyvinyl butyral is above 0.1 to 4.

23. The process for preparing $LiNiO_2$ as claimed in claim 20, wherein the calcination is performed under oxidative atmosphere.

24. The process for preparing $LiNiO_2$ as claimed in claim 23, wherein said oxidative atmosphere is a flow of oxygen for 5 hours or more.

25. A process for preparing $LiNiO_2$ sol comprising the steps of:

mixing an ethanol solution of metal salt prepared by dissolving a first compound selected from the group consisting of lithium nitrate, lithium acetate and lithium hydroxide, and a second compound selected from the group consisting of nickel nitrate, nickel acetate, nickel oxide and nickel hydroxide in an ethanol solution with an ethanol solution of polyvinyl butyral to produce a mixed solution; and heating said mixed solution from 70 to 80° C. to produce a sol.

26. A process for preparing $LiNiO_2$ gel precursor comprising the steps of:

mixing an ethanol solution of metal salt prepared by dissolving a first compound selected from the group consisting of lithium nitrate, lithium acetate and lithium hydroxide, and a second compound selected from the group consisting of nickel nitrate, nickel acetate, nickel oxide and nickel hydroxide in an ethanol solution with an ethanol solution of polyvinyl butyral to produce a mixed solution;

heating said mixed solution from 70 to 80° C. to produce a sol; and heating said sol from 70 to 80° C. to produce a gel precursor.

27. A process for preparing $LiNiO_2$ precursor powder comprising the steps of:

mixing an ethanol solution of metal salt prepared by dissolving a first compound selected from the group consisting of lithium nitrate, lithium acetate and lithium hydroxide, and a second compound selected from the group consisting of cobalt nitrate, cobalt acetate, cobalt oxide and cobalt hydroxide in an ethanol solution with an ethanol solution of polyvinyl butyral to produce a mixed solution;

heating said mixed solution from 70 to 80° C. to produce a sol;

heating said sol from 70 to 80° C. to produce a gel precursor and heating said gel precursor above 500° C. to produce a precursor powder.

* * * * *

UNITED STATES PATENT AND TRADEMARK OFFICE
CERTIFICATE OF CORRECTION

PATENT NO. : 5,914,094
DATED : June 22, 1999
INVENTOR(S) : Yang Kuk Sun; Seong Ho Jin It is certified that error appears in the above-identified patent and that said Letters Patent is hereby corrected as shown below:

Column 1,
Line 37, replace "advantage" with -- advantages --.
Line 52, replace "Battery. Thereby" with -- Battery, thereby --.
Line 64, replace "a Li" with -- an Li --.
Line 67, replace "an cathode" with -- a cathode --.

Column 2,
Line 26, replace "a Li" with -- an Li --.
Line 35, replace "non homogeneous" with -- nonhomogeneous --.
Line 37, replace "is" with -- is --.

Column 3,
Lines 23,27, replace "a $LiCoO_2$" with -- an $LiCoO_2$ -- (both occurrences).
Line 30, replace "for a" with -- for an --.

Column 5,
Line 40, replace "LiCoO2" with -- $LiCoO_2$ --.

Column 7,
Line 2, replace "The to gel" with -- The gel --.
Line 29, replace "72.577" with -- 72.5775 --.

Column 8,
Lines 7-8, replace "Thereafter, The" with -- Thereafter, the --.
Line 41, replace "180to" with -- 180 to --.
Line 51, after "curve" insert -- and --.

Column 9,
Line 54, replace "a $LiCoO_2$" with -- an $LiCoO_2$ --.

Column 10,
Line 15, replace "power" with -- powder --.
Line 17, replace "a hour" with -- an hour --.
Line 45, replace "power" with -- powder --.
Line 47, replace "a hour" with -- an hour --.
Line 50, replace "As Shown" with -- As shown --.

UNITED STATES PATENT AND TRADEMARK OFFICE
CERTIFICATE OF CORRECTION

PATENT NO. : 5,914,094
DATED : June 22, 1999
INVENTOR(S) : Yang Kuk Sun; Seong Ho Jin It is certified that error appears in the above-identified patent and that said Letters Patent is hereby corrected as shown below:

Column 11,
Lines 3, 22, 51, 54, 65, replace "moral" with -- molar -- (all occurrences).

Column 12,
Line 6, replace "moral" with -- molar --.
Line 1, replace "throuth" with -- through --.
Line 66, after "not only" insert -- for --.

Column 14,
Line 62, replace "a electrolyte" with -- an electrolyte --.

Column 15,
Line 15, replace "hysterisis" with -- hysteresis --.
Line 24, replace "hystersis" with -- hysteresis --.
Line 66, replace "(17 m$_2$/g)" with -- (17 m$^2$/g) --.

Column 16,
Line 1, replace "Accordingly, If" with -- Accordingly, if --.

Column 18,
Line 49, replace "inalic" with -- malic --.

Column 19,
Line 1, replace "pal" with -- pH --.

Signed and Sealed this

Twenty-eighth Day of August, 2001

*Attest:*

*Attesting Officer*

NICHOLAS P. GODICI
*Acting Director of the United States Patent and Trademark Office*